US012717169B2

(12) United States Patent
Martin et al.

(10) Patent No.: US 12,717,169 B2
(45) Date of Patent: Aug. 25, 2026

(54) MULTIFOCAL OPHTHALMIC LENS HAVING A PLURALITY OF LAYERS OF CURED POLYMERIZABLE MIXTURE

(71) Applicant: Atheneum Optical Sciences, LLC, Orange Park, FL (US)

(72) Inventors: W. Anthony Martin, Orange Park, FL (US); Randall Pugh, Jacksonville, FL (US); Ganesh Narayanan Kumar, Ponte Vedra Beach, FL (US)

(73) Assignee: Atheneum Optical Sciences, LLC, Orange Park, FL (US)

( * ) Notice: Subject to any disclaimer, the term of this patent is extended or adjusted under 35 U.S.C. 154(b) by 0 days.

(21) Appl. No.: 19/305,706

(22) Filed: Aug. 20, 2025

(65) Prior Publication Data

US 2026/0021631 A1 Jan. 22, 2026

Related U.S. Application Data

(63) Continuation of application No. 18/779,142, filed on Jul. 22, 2024, now abandoned, which is a continuation of application No. 18/235,586, filed on Aug. 18, 2023, now Pat. No. 12,042,981.

(60) Provisional application No. 63/447,493, filed on Feb. 22, 2023.

(51) Int. Cl.

| | |
|---|---|
| ***G02C 7/06*** | (2006.01) |
| ***B29C 64/106*** | (2017.01) |
| ***B29C 64/371*** | (2017.01) |
| ***B33Y 10/00*** | (2015.01) |
| ***B33Y 80/00*** | (2015.01) |
| ***G02C 7/02*** | (2006.01) |
| ***G02C 7/04*** | (2006.01) |

(Continued)

(52) U.S. Cl.

CPC .............. *G02C 7/06* (2013.01); *B29C 64/106* (2017.08); *B29C 64/371* (2017.08); *B33Y 10/00* (2014.12); *B33Y 80/00* (2014.12); *G02C 7/022* (2013.01); *G02C 7/041* (2013.01); *G02C 7/049* (2013.01); *B29K 2105/0002* (2013.01); *B29L 2011/0016* (2013.01)

(58) Field of Classification Search

None

See application file for complete search history.

(56) References Cited

U.S. PATENT DOCUMENTS

| | | | | |
|---|---|---|---|---|
| 10,137,645 | B2 * | 11/2018 | Quere | B29C 64/106 |
| 11,472,141 | B2 * | 10/2022 | Padiou | B29D 11/0073 |
| 2020/0387008 | A1 * | 12/2020 | Padiou | G02C 7/024 |

(Continued)

*Primary Examiner* — Darryl J Collins

(74) *Attorney, Agent, or Firm* — Gregory Finch; Finch Paolino, LLC

(57) ABSTRACT

A multifocal ophthalmic lens and methods of manufacture of the same using additive manufacturing. The multifocal lens includes a front surface and a back surface meeting at a peripheral edge, and a lens center; and a plurality of layers of cured polymerizable mixture each having a lower surface and an upper surface, wherein each of the plurality of layers of cured polymerizable mixture other than a first layer is at least partially integrated with the prior layer at its lower surface, and each has a natural, smooth optical interface at its upper surface. The lens has multiple optical qualities within the same optical path. The lens further may be a contact lens or may have an associated optical power for each optical interface of the layers.

29 Claims, 21 Drawing Sheets

(51) Int. Cl.

| | |
|---|---|
| *B29K 105/00* | (2006.01) |
| *B29L 11/00* | (2006.01) |

(56) References Cited

U.S. PATENT DOCUMENTS

2022/0111610 A1* 4/2022 Verheyen ................. G02C 7/06
2023/0041524 A1* 2/2023 Lecompere ............ B33Y 10/00

* cited by examiner 302
301
303
300
304

303
300A
302
304

301

600

LENS OPTIC ZONE SURFACES

TRANSITION REGION ZONE OF AN ASTIGMATIC LENS

THICKNESS PROFILE FOR THE PERIPHERY REGION ZONE OF AN ASTIGMATIC OPHTHALMIC LENS

THICKNESS PROFILE FOR THE FULL ASTIGMATIC OPHTHALMIC LENS

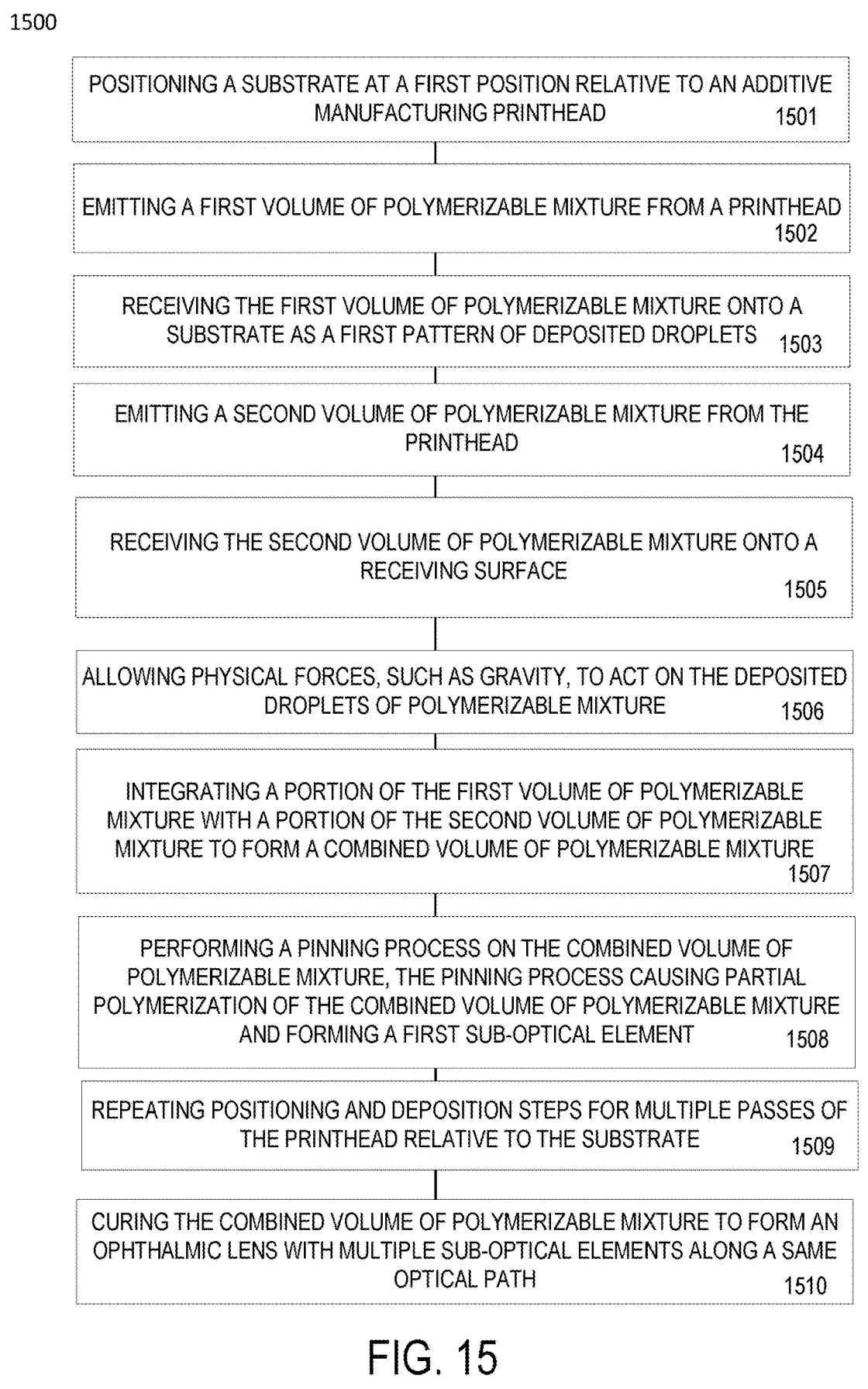

1500

POSITIONING A SUBSTRATE AT A FIRST POSITION RELATIVE TO AN ADDITIVE MANUFACTURING PRINTHEAD 1501

EMITTING A FIRST VOLUME OF POLYMERIZABLE MIXTURE FROM A PRINTHEAD 1502

RECEIVING THE FIRST VOLUME OF POLYMERIZABLE MIXTURE ONTO A SUBSTRATE AS A FIRST PATTERN OF DEPOSITED DROPLETS 1503

EMITTING A SECOND VOLUME OF POLYMERIZABLE MIXTURE FROM THE PRINTHEAD 1504

RECEIVING THE SECOND VOLUME OF POLYMERIZABLE MIXTURE ONTO A RECEIVING SURFACE 1505

ALLOWING PHYSICAL FORCES, SUCH AS GRAVITY, TO ACT ON THE DEPOSITED DROPLETS OF POLYMERIZABLE MIXTURE 1506

INTEGRATING A PORTION OF THE FIRST VOLUME OF POLYMERIZABLE MIXTURE WITH A PORTION OF THE SECOND VOLUME OF POLYMERIZABLE MIXTURE TO FORM A COMBINED VOLUME OF POLYMERIZABLE MIXTURE 1507

PERFORMING A PINNING PROCESS ON THE COMBINED VOLUME OF POLYMERIZABLE MIXTURE, THE PINNING PROCESS CAUSING PARTIAL POLYMERIZATION OF THE COMBINED VOLUME OF POLYMERIZABLE MIXTURE AND FORMING A FIRST SUB-OPTICAL ELEMENT 1508

REPEATING POSITIONING AND DEPOSITION STEPS FOR MULTIPLE PASSES OF THE PRINTHEAD RELATIVE TO THE SUBSTRATE 1509

CURING THE COMBINED VOLUME OF POLYMERIZABLE MIXTURE TO FORM AN OPHTHALMIC LENS WITH MULTIPLE SUB-OPTICAL ELEMENTS ALONG A SAME OPTICAL PATH 1510

FIG. 15

MULTIFOCAL OPHTHALMIC LENS HAVING A PLURALITY OF LAYERS OF CURED POLYMERIZABLE MIXTURE

CROSS-REFERENCE TO RELATED APPLICATIONS

The present application is a continuation of U.S. non-provisional application Ser. No. 18/779,142, filed on Jul. 22, 2024 and entitled, "METHODS OF MANUFACTURE AN OPTICAL ELEMENT BASED UPON AN ENERGY TRANSMISSIBILITY PATTERN," which is a continuation of U.S. non-provisional application Ser. No. 18/235,586, filed on Aug. 18, 2023 and entitled, "MULTIFOCAL POLYMERIC LENSES AND METHODS OF MANUFACTURE," which claims the benefit of U.S. provisional application No. 63/447,493 filed Feb. 22, 2023, the entire disclosure of each of which is incorporated herein by reference.

FIELD OF THE INVENTION

The present invention relates to the field of improved ophthalmic lenses, and, in particular, to methods and apparatus for forming a multifocal ophthalmic device by repeated application of droplets of polymerizable material representative of a mapping of energy transmissibility with multiple disparate optical powers, and a resultant lens.

BACKGROUND OF THE INVENTION

Cast multifocal ophthalmic lenses are currently reliant upon optical power zones that may be imparted into a lens mold via lathing techniques. Reliance on such techniques has inherent limits on the design of the ophthalmic lens. Users often have difficulty adapting to wearing lenses with optical power zones, which may cause problems with perception of a depth of field and/or difficulty ascertaining focus on an object at various distances from the patient's eye.

In addition, zones in the contact lens will have optical characteristics that are only generally adapted to a patient's eye, and a multi-focal contact lens is sometimes prone to rotation in the eye which may further adversely affect a vision correction experience offered by the zoned based ophthalmic lens.

Contact lens manufacturing has evolved over the past several decades from lathe cutting to spin-cast molding to cast molding which remains the most cost-effective process. Lathing a contact lens typically includes machining of a single button of lens material at a time until a desired shape is reached. Such processes require complex lathing equipment and specialized operator expertise. In addition, they are not efficient for high volume production of contact lenses.

Cast molding is effective for high volume production of contact lenses, however each lens is formed according to an approximate size and shape and may vary up to ⅛ or ¼ diopter in a same manufacturing run resulting in a varied patient experience. The varied patient experience is sometimes referred to as a "good contact lens day" and a "bad contact lens day."

Cast molding of an ophthalmic lens is a complicated process involving many variables that are difficult to keep within acceptable parameters causing varied results in a final product. Variables may arise out of one or more of: depositing a curable mixture of polymerizable monomers in a mold cavity, forming the mold cavity via two mold sections, curing the monomer mixture while it is contained in the cavity, disassembling the mold assembly, and removing the lens. One mold section forms an anterior lens surface, and the other mold section forms a posterior lens surface.

The cost of cast-molding equipment is extremely high due to the size of manufacturing lines involved. In addition, fabrication of optical quality metal inserts used to cast the single use lens mold, and subsequent injection molding of plastic molds requires a significant up-front expenditure, and associated designs are limited by symmetry constraints of cast molding techniques. Cast molding also results in a large amount of plastic waste product with detrimental associated environmental impact and additional cost.

Still further, cast molding requires management of an inventory of a huge number of SKUs and associated warehouse management, order picking and shipping logistical problems, all of which add significant environmental detriments and cost to a resulting contact lens product. In addition, a family of contact lenses made by a lens molding process can only have a limited number of variations such as optical power, base curve, and diameter.

SUMMARY OF THE INVENTION

Accordingly, the present invention provides improved methods and apparatus for manufacture of an article with qualities conducive for use as a multifocal optical lens, such as, for example, for use as a contact lens, intraocular lens, or other ophthalmic lens. A new ophthalmic lens type is provided with multiple optical qualities in a same optical path through the ophthalmic lens. The new ophthalmic lens type includes multiple sub-optical elements in a same optical path through which a wearer of the lens sees. The multifocal optical element is also useful in applications not related to biological sight, such as, by way of non-limiting example, use with an endoscope, automated vision, or other electro-optical device.

Aging affects the ability of a person's ciliary muscle and zonular fibers to adjust a shape of the person's ocular lens, as well as their autonomic nervous system control of these structures. Additionally, the brain's selection and processing of images may also be affected by age-related changes in the visual system. These changes can lead to a decline in the person's visual acuity and their ability to focus on objects at varying distances. The present invention provides an ophthalmic lens that helps the human body with visual acuity and helps the human body to be able to focus on objects at various distances by providing multiple sub-optical elements within a same line of sight. The human brain is able to process an image from a neurologically selected image via a sub-optical element provided by the ophthalmic lens.

An ophthalmic lens with multiple sub-optical elements in a same optical path is formed via repeated application of a monomer onto a receiving surface according to an optical design. In some embodiments, the optical design may include an energy intensity map (such as a grayscale image), that maps intensity of an energy spectrum associated with visible light.

Intermittent pinning of deposited polymerizable mixture facilitates formation of multiple sub-optical elements. A final cure, hydration, and release of the deposited monomer forms the multi-focal ophthalmic lens. Additive manufacturing equipment may be controlled to make multiple passes of one or both of a printhead and a receiving surface, adding polymerizable materials to the receiving surface to form a lens (or other article) according to an axial thickness profile, including an in-air lens power (P), lens index of refraction (n), center thickness (CT), and back surface radius of curvature (RB).

According to the present invention, one or both of a printhead and a receiving surface may be placed in a position during deposition that is not perpendicular to an apex of the receiving surface (tilt), and droplets of monomer expelled by the printhead may be non-spherical when they contact the receiving surface. A tilt combined with rotation of one or more of: the receiving surface, the printhead, and the pattern of deposited monomer in between deposition passes of the printhead and the receiving surface, generate multiple sub-optical elements in an article formed along a same optical path. A patient wearing a multifocal lens may neurologically choose which sub-optical element(s) to acknowledge when focusing on an object in sight.

The present invention provides a multi-focal lens without the complexities of disparate zones and the inconvenience of needing to wear the lens in a particular vertical orientation in order to have a satisfactory vision experience.

Improvements also include reduction of waste material, decreased environmental impact, decreased warehousing overhead, and decreased labor required for the manufacture and storing of ophthalmic lenses.

In some embodiments, the present invention facilitates generation of a lens via two or more components, including: an optical zone (sometimes referred to herein as an "OZ"), and a peripheral zone, or edge portion. One or both of: the optical zone, and the peripheral zone may be formed based upon an energy intensity pattern descriptive of an unhydrated axial thickness profile.

Some embodiments of the present disclosure may include a method of forming an ophthalmic lens via additive manufacturing, the method including the steps of positioning a substrate at a first position relative to an additive manufacturing printhead and emitting a pattern of deposited droplets of polymerizable mixture from the printhead, the pattern of deposited droplets of polymerizable mixture corresponding with a portion of an energy transmissibility map of an ophthalmic lens being formed.

Some embodiments of the present invention include receiving deposited droplets of polymerizable mixture on a receiving surface, the receiving surface including one or both of: a substrate, and insert, and previously emitted polymerizable mixture. Embodiments may include repositioning the substrate from a first position to a next position (current position plus N) relative to a printhead. Repositioning may be accomplished via movement of one or both of the substrate and the printhead.

Additionally, variants of the present invention may include emitting a next pattern of deposited droplets of polymerizable mixture (first position plus N) corresponding with a next portion of the energy transmissibility map of the ophthalmic lens being formed. Multiple emissions may occur during a pass of the printhead relative to the receiving surface, which may include the substrate.

Some variants of the present invention may include integrating material from deposited droplets of polymerizable mixture on the receiving surface and exposing the integrated material to a pinning process causing partial polymerization of the deposited droplets of polymerizable mixture. Following a pass of the printhead, one or more of gravity, surface tension and microforces, may be allowed to act on at least some of the deposited droplets to smooth the polymerizable mixture on the receiving surface, such as leveling interstitial spaces between deposited droplets.

In some embodiments, at least some of the droplets of polymerizable mixture deposited during a current pass may be integrated with polymerizable mixture previously deposited onto the receiving surface to form a same volume, which may include a single volume of polymerizable mixture on the substrate. Embodiments may also include pinning deposited droplets on a receiving surface via partial polymerization of the of deposited droplets; and curing the deposited droplets of polymerizable mixture. Integration of deposited droplets alleviates the disclosed processes from the requirement of a droplet maintaining a particular shape during deposition, upon impact, or following impact.

In some embodiments, a pinning process may include the step of exposing the deposited droplets of polymerizable mixture to a first wavelength of actinic radiation for a limited amount of time sufficient to cause gelation of the deposited droplets of polymerizable mixture, yet not cause curing of the deposited droplets.

Additionally, in some embodiments, a cure process may include a step of exposing deposited droplets of polymerizable mixture to a second wavelength of actinic radiation for a sufficient time and of sufficient intensity to cause polymerization of deposited droplets of polymerizable mixture deposited in one or multiple cycles of droplet deposition.

The present invention additionally provides for a method of manufacture that includes a periphery of an object being formed, and a center portion of the object to be contained with the periphery portion. For example, in some embodiments of the present invention, an ocular contact lens with a generally spherical shape may have an edge portion including an essentially ring shape volume of polymerizable mixture formed via additive manufacture (or other manufacturing method, such as machining and/or molding) and an optic zone of the contact lens formed within the perimeter portion via additive manufacturing processes.

In some embodiments of the present invention, an edge portion may include a greater mass than a center portion that includes an optic zone. During formation, a perimeter ring forming the edge portion may be partially or fully cured, and internal stresses of a forming lens may be borne more so in heavier mass portions included in the perimeter ring.

Forming an edge portion while it is not being acted upon by a center portion allows the edge portion to form with reduced stresses during cure of deposited polymerizable mixture into a polymer. While the examples provided herein are described with reference to a spherical contact lens, other embodiments are within the scope of the present invention, such as oblong or crescent shaped contact lenses or other articles, such as a complex shaped intraocular lens, an endoscope lens, or electronic device camera lens.

In some aspects, the present invention provides for application of a pattern of multiple defined areas included within a single lens, with each area representing an amount of light transmissible through each respective associated area. Each area may have a light transmissibility value based upon a scale, such as an 8 bit, 16 bit, 32 bit or 64 bit scale (other scales are also within the scope of the present invention).

In some embodiments, each area may refer to a smallest single component of a digital image. Still further, in some embodiments, a smallest single component of the digital image may be referred to herein as a "pixel." In some embodiments, a pixel may be associated with a distance measurement, such as, for example, a quantity of nanometers.

The present invention provides for subsequent application of polymerizable material in multiple successive patterns, each successive pattern matching a grayscale image. Following application of each pattern of the grayscale image, the polymerizable material is pinned, but not fully polymerized.

Following a final application of the monomer in the pattern of the grayscale image, monomer aggregated from each application of the grayscale image is polymerized to form a polymer lens, such as, for example, a hydrogel contact lens formed primarily from etafilcon.

Application of multiple successive grayscale image patterns, which may be deposited one on top of another, overlapping each other, or positioned side by side to each other, is preferably conducted in a controlled atmosphere. The atmosphere may be controlled, by way of non-limiting example, to limit specific amounts of variables, such as one or both of: airborne particulate and gases present in the atmosphere during specific process steps involved in a manufacturing process. By way of specific example, preferred embodiments include an atmosphere with a limited amount of oxygen to which a monomer is exposed prior to polymerization, and also limit a size and an amount of particulate that may interact with monomer prior to polymerization.

In some embodiments, with some monomers or other polymerizable mixture, oxygen may be controlled as a critical variable involved in free-radical polymerization of monomeric materials and prepolymers involved in the manufacturing process. Limiting an amount of oxygen a monomer is exposed to may be particularly relevant for ophthalmic devices formed with hydrogels containing relatively low levels of cross-linker which are to be hydrated after polymerization, and which are susceptible to easy distortion in shape from variations in a resulting polymer network. Limiting an amount of oxygen a polymerizable mixture is exposed to may also be particularly relevant for additive manufacturing processes that involve small droplets of polymerizable mixture to travel through an ambient atmosphere. The small droplets of polymerizable mixture increase a surface area of exposure of the polymerizable mixture to potential outside factors (for a given volume of polymerizable mixture required to manufacture a lens) for the duration of time that the polymerizable mixture remains in droplet form in the ambient atmosphere. As the droplets aggregate into a larger volume on the receiving surface, the surface area is reduced.

According to another aspect of the present invention, exposure of a polymerizable mixture to a gas (such as oxygen) that may affect polymerization characterization, and is therefore carefully controlled in one or more of: an amount of exposure, a consistency of exposure throughout the monomer; and a duration of exposure, of the polymerizable mixture to the gas. It has been discovered that, during polymerization, if oxygen concentration is higher on one side (Side 1) (or other portion of the monomer forming an optical device) as compared to a second side (Side 2) or another area, Side 1 may expand relatively more than Side 2 expands, and a distortion of optical properties inherent in a resulting optical device may occur.

Similarly, a portion of a polymerizable mixture with more or less oxygen concentration may expand in an amount that differs than another portion with a different amount of oxygen concentration. By limiting availability of oxygen to the polymerizable mixture prior to polymerization, a relatively consistent oxygen concentration may be maintained within the polymerizable mixture, and a consistent swell factor caused by oxygen concentration is thereby achieved.

In some practices, relatively high concentrations of initiators, high intensity UV light energy, oxygen scavengers, waxes, or coatings may be used to manage the effects of oxygen, prior to polymerization of a polymerizable mixture. However, to date none of these has been shown to consistently fabricate high quality optical devices.

The present invention takes a novel approach in the use of three-dimensional (sometimes referred to as "3D") printing apparatus to create optical elements, such as ophthalmic devices, by controlling the presence and concentration of oxygen to low levels and/or at the same time in adjusted concentrations. In some embodiments, it is beneficial to control a level of oxygen in a polymerizable mixture with respect to a level of oxygen in an ambient atmosphere of the polymerizable mixture during manufacture of the optical device in order to obtain a desired dimensional and resultant optical properties of the optical element included in the optical device. This principle may also be extended to include a substrate onto which deposited monomer is received. Therefore, some embodiments of the present invention may include an oxygen level maintained in a receiving substrate at a predetermined level before and during a polymerization process.

The present invention also includes methods for three-dimensional deposition printing of a multi-focal optical element, in which method a plurality of droplets of a polymerizable mixture are deposited onto a surface of a substrate under a controlled atmosphere thereby forming a pattern of energy intensity transmission through the deposited polymerizable mixture, such as a grayscale with the polymerizable mixture. A controlled atmosphere containing the droplets of polymerizable mixture and the deposited pattern of polymerizable mixture is maintained in the controlled environment with an oxygen concentration of at most about 5.0 volume-% (and preferably at most about 1.0 volume %). The oxygen equilibrium concentration of the polymerizable mixture may be limited to at the most about 8.0 volume-% (and preferably at most about 2.0 volume %). In this context, due to constraints of measuring a volume % of oxygen in the polymerizable mixture and ambient environment, "about" may be considered to be within 10% of the stated amounts.

BRIEF DESCRIPTION OF THE DRAWINGS

FIG. 15 illustrates a flowchart of method steps that may be executed in some implementations of the present invention.

DETAILED DESCRIPTION OF THE INVENTION

Figure 1:
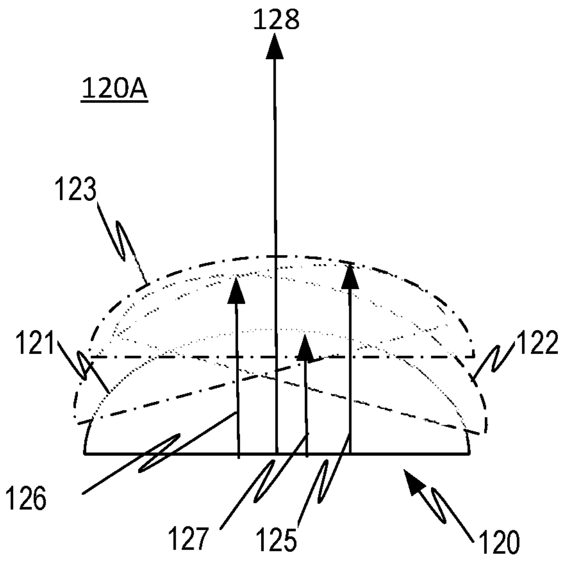
FIG. 1 illustrates a schematic diagram of a multifocal lens with a side view, and an elevation view, according to some embodiments of the present invention.
Figure 1:
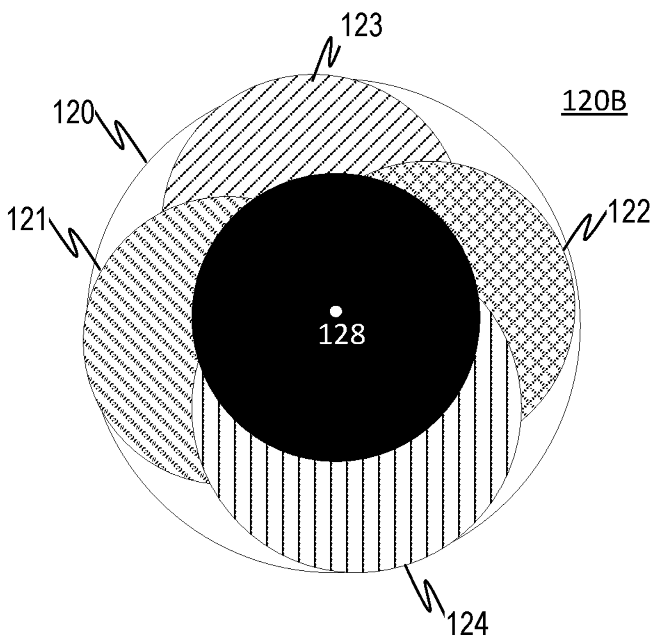

According to the present invention, an ophthalmic lens with multiple optical characteristics, such as optical powers, along a same optical path may be constructed via applying small droplets of polymerizable mixture to a receiving surface based upon a pattern or map of energy transmissibility. As used herein, in relation to an ophthalmic lens, optical characteristics may include the interaction of the ophthalmic lens with electro-magnetic radiation in the visible light spectrum.

The present invention provides ophthalmic lenses with optical characteristics at sub-optical elements along a same optical path formed within the ophthalmic lens via the processes described herein for the formation of the ophthalmic lens. For example, an optical characteristic may be formed into a body of an ophthalmic lens via the pinning of deposited droplets of polymerizable mixture on a receiving surface prior to a subsequent deposition of additional droplets onto the pinned polymerizable mixture. A final cure of the deposited polymerizable mixture forms an article that may be hydrated and used as an ophthalmic lens. A person wearing the ophthalmic lens may neurologically select which optical characteristic to acknowledge while the person focuses on an item in the person's sight path and looks along a same optical path.

The ability to neurologically choose an optical characteristic along a same optical path mimics a person's innate vision experience that they are born with, and is more natural than previous multifocal lenses that required a user to select a different optical path in small disparate optic zones contained within the previous multifocal lens.

As a human ages, it is normal for the anatomy of their eyes to change, including a decrease in the ability of the person's ciliary muscles and zonular fibers to adjust a shape of their ocular lenses. Such changes in anatomy (generally referred to as presbyopia) can lead to a decline in the person's ability to focus on objects at varying distances.

In particular, as a result of aging, the ciliary muscle becomes less flexible making it more difficult to adjust a shape of their ocular lens. As humans age, the zonules in the human eye become weaker and less elastic. This causes the lens to become less flexible and less able to change shape. As a result, the eye's ability to focus on near objects decreases, leading to a condition known as presbyopia. This condition is a normal part of the aging process and is usually noticed in people over the age of 40. The weakening of the zonules also causes the lens to become more opaque. The overall effect is that the range of accommodation becomes more limited, and it becomes more difficult to focus on nearby objects.

Additionally, the autonomic nervous system control of the ciliary muscle and zonular fibers is also typically affected by aging. Studies have shown that as humans age there is a decrease in parasympathetic activity that controls their ciliary muscle which leads to a decreased accommodation ability, while at the same time the brain's processing speed and accuracy of selection of an image to be processed by the visual system also declines which adversely affects their ability to process images quickly and efficiently.

In a related aspect, a person's sympathetic nervous system is responsible for controlling their ciliary muscles during accommodation for distant vision. When we look at distant objects, the sympathetic branch of the ANS is activated, causing the ciliary muscle to relax. This relaxation increases the tension on the zonular fibers, allowing the lens to flatten and decrease its refractive power. The brain plays a crucial role in selecting the image to be processed by the visual system. The visual cortex receives information from the eyes and processes it to create a visual perception of the world around us. The brain uses various cues to select an image to be processed, such as the amount of light, the contrast of the object, and its position in the visual field. Overall, the ANS controls the ciliary muscle and zonular fibers to focus on objects at varying distances, while the brain selects the image to be processed from the input provided by the visual system.

The biological process of focusing on an image, (generally referred to as "accommodation") requires coordinated actions of several structures in the human eye, including the ciliary muscles and the zonular fibers. The brain plays a critical role in this process by receiving information from the eyes and sending signals back to control the muscles and fibers involved. When the eye is focusing on a distant object, ciliary muscles relax, and zonular fibers become taut, which causes the lens to flatten. However, when the brain asks the eye to focus on a nearby object, the brain sends signals to the ciliary muscles, causing the ciliary muscles to contract while at the same time the brain signals the zonular fibers to release tension, allowing the lens to become more rounded, which increases the lens' refractive power. The brain also takes into account other factors, such as a distance of the eye to an object of interest, and an amount of light present.

Coordination of the ciliary muscles and zonular fibers is essential for successful accommodation using biological image generation. The present invention provides an ophthalmic lens that simultaneously provides multiple images to the brain and allows the brain to select a particular image to process. The multiple images are formed via different sub-optical elements along a same path through an ophthalmic lens according to the present invention. A wearer of an ophthalmic lens according to the present invention may synchronize neurological processes with a cognitive purpose to focus on an available image presented to the optic nerve.

The processes and apparatus of the present invention generate multiple different sub-optical elements within the ophthalmic lens via successive application of a polymerizable mixture based upon a map of transmissibility of visible light energy (or other predefined pattern). A surface of the ophthalmic lens of the present invention may be a generally planar surface; an arcuate surface; or a complex variable surface. Droplets of polymerizable mixture applied to a receiving surface accumulate into a pattern of polymerizable mixture replicating the map of energy transmissibility. Following application of polymerizable mixture to a receiving surface, the applied polymerizable mixture is exposed to a limited amount of actinic conditions, such as radiation (limited in intensity and/duration) and/or thermal energy. Exposure to the limited amount of actinic radiation is appropriate to pin the applied polymerizable mixture into position.

Polymerizable mixture that has been pinned may act as a subsequent receiving surface and receive additional polymerizable mixture applied in a pattern of energy transmissibility. After a final application of polymerizable mixture, the polymerizable mixture accumulated on the receiving surface may be exposed to sufficient actinic conditions, (e.g., radiation and thermal energy) to cure the accumulated polymerizable mixture into a polymer.

An atmosphere encompassing the droplets of polymerizable mixture during application onto the receiving surface and during pendency on the receiving surface prior to cure, may be carefully controlled in order to achieve a consistent optical quality of a device formed by the cured polymerizable mixture.

Glossary

In this description and claims directed to the presented invention, various terms may be used for which the following definitions will apply:

"Actinic Radiation" as used herein, refers to emission of energy that is capable of initiating a chemical reaction in an associated Polymerizable Mixture. In some embodiments, actinic radiation includes radiation with a wavelength of energy in a range of 280-450 nm. In some more specific examples embodiments, an actinic radiation corresponding to UVA and blue light includes an energy with a wavelength in the range of 315-450 nm, some preferred embodiments include energy in the 365 nm to 400 nm range.

"Addition Based Manufacture" (sometimes referred to herein as "additive manufacturing" means a process during which units of material are added to a structure being formed via the aggregation of the units of material into a shape.

"Arcuate" as used herein, refers to a geometric shape including a curved portion.

"Cure" as used herein refers to exposing a polymerizable mixture to actinic conditions which may include Fixing Radiation and/or thermal energy of sufficient intensity and for a sufficient duration of time to crosslink a majority of Polymerizable mixture.

"Diopter" as used herein, refers to a unit of refractive power that is equal to a reciprocal of a focal length (usually in meters) of a given sub-optical element.

"Fixing Radiation" as used herein, refers to Actinic Radiation of appropriate wavelength, and sufficient intensity and duration to crosslink a majority of Polymerizable mixture exposed to the Fixing Radiation.

"Gelling" or "Gelation" refers to a degree of polymerization sufficient to stop or substantially slow movement of polymerizable mixture deposited on a receiving surface while allowing subsequent droplets to meld or otherwise integrate with previously deposited polymerizable mixture and form a structure with a single mass of polymerizable mixture without distortion. Gelled polymerizable mixture moves to a higher viscosity state, but stops short of full cure. Pinning or gelation (or gelling) enhances the management of flow and form, and provides a high-quality surface.

"Gel Point" as used herein shall refer to a point in a polymerization process at which a gel or insoluble fraction is formed. Gel point may be considered the extent of conversion at which the liquid polymerization mixture becomes a high viscous material that is immobile on a stationary surface. Gel point can be determined, for example, using a Soxhlet experiment: Polymer reaction is stopped at different time points and a resulting polymer is analyzed to determine a weight fraction of residual insoluble polymer. The data can be extrapolated to a point where no gel is yet present. This point, where some polymer reaction has occurred, but no gel is present, is the gel point. The gel point may also be determined by analyzing a viscosity of a polymerizable mixture during a reaction. The viscosity can be measured using a parallel plate rheometer, with the polymerizable mixture between the plates. At least one plate should be transparent to radiation at the wavelength used for polymerization. The point at which the viscosity approaches infinity is the gel point. Gel point may generally be considered to occur at the same degree of conversion for a given polymer system and specified reaction conditions.

"Inhibitor" as used herein refers to a chemical reactant or process that slows or halts a chemical reaction.

"Initiator" as used herein refers to a substance that initiates a chain reaction or polymerization.

"Intensity" as used herein refers to an amount of power transferred per unit area, where the area is measured on a plane perpendicular to a direction of propagation of the energy (e.g., watts per square meter ($W/m^2$)).

"Meld" (sometimes referred to integrate) as used herein means to merge together droplets of polymerizable mixture from two or more depositions so that they become a single item with polymer chains that include polymerizable mixture from a first deposition and polymerizable mixture from a second deposition.

"Ophthalmic Lens" as used herein refers to an ophthalmic device that resides in or on the eye. These devices can provide optical correction or may be cosmetic. For example, the term lens can refer to a contact lens, intraocular lens, overlay lens, ocular insert, optical insert, or other similar device through which vision is corrected or modified, or through which eye physiology is cosmetically enhanced (e.g., iris color) without impeding vision.

"Optical" as used herein refers to a characteristic modifying or relating to a behavior or property of light.

"Optical Interface" as used herein refers to an object, or portion of an object that affects a behavior or property of light.

"Pinning" as used herein refers to the application of actinic conditions, such as exposure to limited actinic radiation, to a polymerizable mixture in an amount sufficient to perform a gelation process or gelling, but not cause the polymerizable mixture to cure.

"Polymerizable Mixture" (sometimes referred to as "PM" or "polymerizable mixture") as used herein, refers to a liquid mixture of components (reactive and possibly also non-reactive components) which upon exposure to an external energy (e.g., actinic radiation in a range of 280-450 nm (e.g., UV-light or blue light or heat) is capable of undergoing polymerization to form a polymer or polymer network. A polymerizable mixture may include a monomer or prepolymer material which can be cured and/or crosslinked to form an ophthalmic lens or modify an existing lens or lens blank. Various embodiments can include Polymerizable Mixtures with one or more additives such as: UV blockers, bonding agents, tints, photo initiators or catalysts, and other additives one might desire in an ophthalmic lenses such as, contact, or intraocular lenses. In some embodiments, a Polymerizable Mixture may also be a Hydrogel Precursor.

"Sub-optical Element" as used herein, refers to a portion of an Ophthalmic Lens that forms an Optical Interface.

When used herein, the expression oxygen equilibrium concentration of the polymerizable mixture of X is intended to mean the oxygen concentration in the polymerizable mixture obtained if the mixture hypothetically is allowed to equilibrate at 1.0 atmospheres (1013 millibar) with an atmosphere having an oxygen concentration of X %.

When used herein, the term optical element is intended to include but not limited to ophthalmic devices, lenses used in industrial applications, lenses for endoscopes, inspection devices, fiber optics devices, camera lenses, telescopic lenses etc. Currently particularly interesting embodiments hereof are ophthalmic devices.

In some embodiments, an optical element has one or more objects embedded therein, e.g., a solid object selected from inserts, electronics, and functional additive releasing reservoirs or depots.

In other embodiments, an optical element includes one or more functionally active substances including biologically active substances.

As used herein, an ophthalmic device includes any device which is in front of the eye or resides in or on the eye or any part of the eye, including the cornea, eyelids, and ocular glands. These devices can provide optical correction, cosmetic enhancement (e.g. for iris color), vision enhancement, therapeutic benefit (for example as bandage lenses) or devices which deliver therapeutic agents such as lubricants, wetting agents, active pharmaceutical ingredients (which may sometimes be referred to as "API") and biological agents which may be anti-inflammatory, anti-allergy, anti-bacterial, anti-infective, anti-hypertensive, etc. or delivery of nutraceuticals, vitamins and antioxidants for ocular health or a combination of any of the foregoing. Illustrative examples of ophthalmic devices include those selected from a spectacle lens, a contact lens (e.g., a soft contact lens or a hard contact lens), an implantable contact lens, an intraocular lens, an overlay lens, a corneal implant, such as a corneal inlay implant, and an ophthalmic/ocular insert.

In some embodiments, the ophthalmic device is a contact lens, in particular a soft contact lens, such as a contact lens of a hydrogel material, other embodiments may include an intraocular lens of hydrogel material.

The term hydrogel refers to crosslinked polymers which have absorbed water (swelled) to a water content of at least 10 weight-% thereof. Preferably such hydrogel materials have a water content of at least 20 weight-%, such as at least 25 weight-%, and up to 70 to 90 weight-%.

When used herein, the term polymerizable mixture refers to a liquid mixture of components (reactive and possibly also non-reactive components) which upon exposure to an external energy (e.g., actinic radiation 280-450 nm (like UV-light or blue light) or heat) is capable of undergoing polymerization to form a polymer or polymer network. Typically, the mixture comprises reactive components such as monomers, macromers, prepolymers, cross-linkers, and initiators. Moreover, polymerizable mixture may further include other ingredients such as, by way of non-limiting example, one or more of: additives such as wetting agents, release agents, dyes, light absorbing compounds such as UV absorbers and photochromic compounds, any of which may be reactive or non-reactive but are capable of being retained within the resulting ophthalmic device, as well as one or more: pharmaceuticals, vitamins, antioxidants, and nutraceutical compounds. It will be appreciated that a wide range of additives may be added based upon the ophthalmic device, how the ophthalmic device is made, and the ophthalmic device's intended use.

A mixture may be considered a polymerizable mixture if one or more constituents of the mixture (such as, for example, monomer, macromers, prepolymers, crosslinkers, etc.) includes at least one polymerizable functional group, such as an ethylenically unsaturated group, such as, by way of non-limiting example: (meth)acrylate, (meth)acrylamide, vinyl, N-vinyl lactam, N-vinylamide, and styryl functional groups.

In some embodiments, a Polymerizable Mixture contains at least one hydrophilic component. In some embodiments, hydrophilic components included in a Polymerizable Mixture may be selected from the hydrophilic monomers, e.g., those known to be useful to prepare hydrogels.

In some exemplary and specific embodiments, hydrophilic means that at least 5 grams of a compound(s) are soluble in 100 mL of deionized water at 25° C. under weakly acidic (pH between 5 and 7) or basic conditions (pH form 7 to 9), and in some embodiments 10 grams of the compound (s) are soluble in 100 mL of deionized water at 25° C. under weakly acidic or basic conditions. Other embodiments are also within the scope of the invention. In addition, in other uses the "hydrophilic" may be ascertained by methods other than solubility, and the term may be used as a condition and/or a modifier.

In some exemplary and specific embodiments, "hydrophobic" means that 5 grams of hydrophobic compound does not fully dissolve in 100 mL of deionized water at 25° C. under weakly acidic or basic conditions. The solubility of the compounds can be confirmed by visual observation, with any visible precipitants or turbidity indicating that the compound is hydrophobic. Solubility may be determined, for example, in some embodiments, after about eight hours of mixing or stirring. Other embodiments are also within the scope of the invention. In addition, in other uses the condition of "hydrophobic" may be ascertained by methods other than solubility, and the term may be used as a condition and/or a modifier.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term vinyl-type or vinyl-containing monomers refer to monomers containing the vinyl grouping (—CH═CH2) and that are capable of polymerizing. Examples of hydrophilic vinyl-containing monomers include, but are not limited to, monomers such as N-vinyl amides, N-vinyl lactams (e.g., N-vinylpyrrolidone (NVP)), N-vinyl-N-methyl acetamide, N-vinyl-N-ethyl acetamide, and N-vinyl-N-ethyl formamide, N-vinyl formamide. Alternative vinyl-containing monomers include, but are not limited to, 1-methyl-3-methylene-2-pyrrolidone, 1-methyl-5-methylene-2-pyrrolidone, and 5-methyl-3-methylene-2-pyrrolidone.

Acrylic-type or acrylic-containing monomers are those monomers containing the acrylic group: (CH2═CRCOX) wherein R is H or CH3, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid, and mixtures thereof.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated C1-20 alkyl glucosides, and ethoxylated bisphenol A reacted with one or more molar equivalents of an end-capping group such as isocyanatoethyl methacrylate, methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups. Other suitable hydrophilic monomers will be apparent to one skilled in the art.

In some exemplary and nonlimiting embodiments, the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

Hydrophilic component(s) (e.g., hydrophilic monomer(s)) may be present in a wide range of amounts, depending upon the specific balance of properties desired. In some embodiments, the amount of the hydrophilic component is up to 60 weight-%, such as from 5 to 40 weight-% based upon all reactive components.

Hydrophobic silicone-containing components (or silicone components) may be considered those that contain at least one [—Si—O—Si] group in a monomer, macromer or prepolymer. In some embodiments, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups.

Also, in some exemplary and nonlimiting embodiments, cross-linking monomers may be employed, either singly or in combination, and may include ethylene glycol dimethacrylate, trimethylolpropane trimethacrylate, glycerol trimethacrylate, polyethylene glycol dimethacrylate (wherein the polyethylene glycol has a molecular weight up to, e.g., 400), and other polyacrylate and polymethacrylate esters. The cross-linking monomer may be used in the usual amounts, e.g., from 0.1 to 5, and preferably in amounts of from 0.2 to 3, parts by weight per 100 parts by weight of the polymerizable mixture.

Another monomer that may also be used in some exemplary and nonlimiting embodiments, includes methacrylic acid, which may be used to influence an amount of water that a hydrogel may absorb at equilibrium. Methacrylic acid is usually employed in amounts of from 0.2 to 8 parts by weight per 100 parts of the hydrophilic monomers like HEMA. Other monomers that can be present in the polymerization mixture include methoxyethyl methacrylate, acrylic acid, and the like.

In some exemplary and nonlimiting embodiments, the polymerizable mixture comprises hydroxyethyl methacrylate (HEMA) or hydroxyethyl acrylate (HEA) monomers, preferably hydroxyethyl methacrylate (HEMA) monomers.

In some exemplary and nonlimiting embodiments, the polymerizable mixture comprises methacrylate or acrylate monomers, not being hydroxyethyl methacrylate or hydroxyethyl acrylate monomers.

In some exemplary and nonlimiting embodiments, the polymerizable mixture comprises reactive silicone monomers or oligomers.

In some further some exemplary and nonlimiting embodiments, the polymerizable mixture after polymerization may provide a polymer which is non-swellable in water, e.g., a polymer that is not able to take up a water content of more than 2 weight-%.

One or more polymerization initiators may be included in the polymerizable mixture. Examples of polymerization initiators include, but are not limited to, compounds such as lauryl peroxide, benzoyl peroxide, isopropyl percarbonate, azobisisobutyronitrile, and the like, which generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photo-initiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available ultra-violet and visible light initiator systems include, but are not limited to, Irgacure 819® and Irgacure 1700® (from Ciba Specialty Chemicals) and Lucirin TPO initiator (available from BASF). Commercially available UV photo-initiators include Irgacure 651, Darocur 1173 and Darocur 2959 (Ciba Specialty Chemicals). These and other photo-initiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998.

In some embodiments, a polymerization initiator is included in a polymerizable mixture in amounts capable of initiating polymerization of the polymerizable mixture, such as 0.1 to 2 weight-%. Polymerization of the polymerizable mixture can be initiated using the appropriate choice of heat or visible or ultraviolet light, or other energy, depending upon a polymerization initiator used. Alternatively, in some embodiments, initiation can be conducted without a photo-initiator using, for example, e-beam. However, when a photo-initiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and DMBAPO, and in another embodiment the method of polymerization initiation is via visible light activation.

In some embodiments, a polymerizable mixture may include one or more internal wetting agents. Internal wetting agents may include, but are not limited to, high molecular weight, hydrophilic polymers. Examples of internal wetting agents include, but are not limited to, polyamides such as poly(N-vinyl pyrrolidone) and poly(N-vinyl-N-methyl acetamide).

The internal wetting agent(s) may be present in a wide range of amounts, depending upon the specific parameter desired. In some embodiments, the amount of the wetting agent(s) is up to 50 weight-%, such as from 5 to 40 weight-%, such as from 6 to 30 weight-% based upon all reactive components.

Moreover, a polymerizable mixture may contain one or more auxiliary components selected from, but not limited to, chelating agents, polymerization inhibitors, viscosity regulating agents, surface tension regulating agents, glass transition regulating agents, compatibilizing components, ultraviolet absorbing compounds, medicinal agents like ophthalmic pharmaceutical agents, ophthalmic demulcents, excipients, antimicrobial compounds, copolymerizable and non-polymerizable dyes, release agents, reactive tints, pigments, and chelating agents, and combinations thereof. In some embodiments, the sum of such auxiliary components may be up to 20 weight-%. Preferred embodiments may include photo initiators that create reactive species when exposed to one or more of: visible light, ultraviolet light, red light, and infrared light, and may include one or more of a: visible light, ultraviolet light, red light, and infrared light absorbing moiety, A polymerizable mixture may be prepared, for example, by simple mixing of the constituents of the mixture. In some embodiments, reactive components (e.g., hydrophilic monomers, wetting agents, and/or other components) are mixed together with an inert diluent to form the polymerizable mixture. Such diluents may have the effect of controlling expansion of an ophthalmic device formed upon hydration, assisting in solubility of components, and regulating a glass transition temperature. Other embodiments may exclude the inert diluent.

Classes of suitable diluents include, without limitation, alcohols having 3 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increases, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In some embodiments, the diluents are selected from 1,2-octanediol, t-amyl alcohol, 3-methyl-3-pentanol, decanoic acid, 3,7-dimethyl-3-octanol, 2-methyl-2-pentanol, 2-ethyl-1-butanol, 3,3-dimethyl-2-butanol, tripropylene methyl ether (TPME), butoxy ethyl acetate, mixtures thereof and the like.

In some embodiments, the diluents are selected from those that have some degree of solubility in water. In some embodiments at least about three percent of the diluent is miscible with water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, ethanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like. Esters of alcohols, such as boric acid esters of alcohols, are other embodiments of diluents.

In some embodiments, an amount of diluent preferred is typically up to 60 weight-%, such as from 10 to 60 weight-%, such as from 20 to 50 weight-%, based upon the complete polymerizable mixture.

In another aspect, in some embodiments, a polymerizable mixture includes one or more cross-linkers in an amount of 0.5 to 5.0 weight-%, one or more non-reactive diluents (such as polyhydric alcohols, esters of polyhydric alcohols or ethers of polyhydric alcohols, e.g. glycerols and glycerol esters) in an amount of 0 to 60.0 weight-%, and one or more polymerization inhibitors in an amount of less than 100.0 ppm and preferably less than 50.0 ppm, based on the weight of the polymerizable mixture. A viscosity of the polymerizable mixture may also play an important role, and is typically 1-25 cP, such as 2-15 cP, in particular 3-10 cP, although other viscosities are within the scope of the present invention.

As mentioned above, the oxygen equilibrium concentration of the polymerizable mixture is preferably 0.05-8.0 volume-%, e.g., 0.2-6.0 volume-%, e.g., in the range of 0.5-6 volume-%. The lower limits (such as 0.05%, 0.1%, 0.2% etc.) are stated for practical reasons and it is quite possible to achieve even lower concentrations.

An oxygen content of a polymerizable mixture may be adjusted to a desired level (X) by exposing the polymerizable mixture (previously being mixed under an ambient atmosphere (1013 mbar, 21 volume-% O2)) to a reduced pressure P, where P=X*1013/21 mbar. Subsequently the reduced pressure (sometimes referred to as a "vacuum") can be released and the oxygen-adjusted polymerizable mixture can be stored under an atmosphere having an oxygen concentration corresponding to a suitable atmosphere having an oxygen concentration of X.

In some preferred embodiments, the oxygen concentration in a controlled atmosphere ambient to deposited polymerizable mixture, and a substrate in contact with the polymerizable mixture is lower than the oxygen equilibrium concentration in the polymerizable mixture.

Three-Dimensional Printing Device

The deposition of a plurality of droplets is typically achieved by breaking a volume of Polymerizable Mixture into droplets and propelling the droplets in a desired direction at a predetermined velocity. In some embodiments, such generation of droplets of Polymerizable Mixture and propelling of the droplets in a given direction at a predetermined velocity may be accomplished via operation of an additive manufacturing printhead. Such printheads are capable of simultaneous deposition of a plurality of droplets of a liquid either in a one-dimensional pattern (e.g.; in the form of lines) or in a two-dimensional pattern. In some embodiments, a droplet is preferably in a smaller range for additive manufacturing, such as, for example, in a picolitre range, such as between about 3 picolitres and 20 picolitres per droplet and preferably 10 to 30 passes of a printhead in relation to a substrate. In some embodiments, an ophthalmic lens is formed via 14 to 18 passes of a printhead expelling droplets in a desired pattern relative to a receiving surface.

In some embodiments, a desired speed and accuracy of a deposition of the plurality of droplets may be accomplished with an additive manufacturing printhead capable of simultaneous deposition of a two-dimensional pattern of polymerizable mixture so that a pattern (or multiple successive patterns) of droplets of the polymerizable mixture representing an integer map of energy transmissibility (e.g.; a grayscale image) of a desired article (such as an ophthalmic lens) can be printed.

In some preferred embodiments, dispersion and propulsion of droplets forming a two-dimensional pattern representing an integer map of energy transmissibility in the form of a grayscale image is achievable in a single pass of a printhead depositing droplets in an area at least the size of the ophthalmic device. Commercially available printing heads suitable for this purpose include the Samba™ printhead from Fujifilm, e.g., Samba™ G3L Printhead which has 2048 nozzles per module and is capable of deposition of liquids in the order of 2.4 picolitre for native drop size to 13.2 picolitre maximum drop size at a 1200 native dpi accuracy.

A pattern of each pass of droplets expelled, propelled, and deposited by the 3D printing device, may be determined in relation to a desired transmissibility pattern of an optical lens to be formed. A shape of the optical lens being formed that correlates with the transmissibility pattern. For example (in case of an ophthalmic device), data gathered from measuring a patient's eye may be used to generate input. Data may include, for example, optical characteristics, surface properties, size and shape dimensions and observations of an ocular disease state.

Three-dimensional printable models may be created, by way of non-limiting example, based upon a computer aided design (CAD) software, or a scan of a patient's eye. Patient eye scanning may include collecting and analyzing digital data representative of a shape and appearance of the patient's eye. Based on collected data, a three-dimensional model of a target ophthalmic device may be produced. The 3D printable model may be processed by software to convert the model into a grayscale image (or other energy intensity mapping) and produce a file containing instructions tailored to a specific type of droplet expulsion devices, such as, for example, a 3D printer to repeatedly deposit polymerizable mixture according to the grayscale image or other energy transmissibility pattern.

Substrate

The present invention provides for depositing a plurality of droplets of polymerizable mixture onto a surface of a substrate. Suitable materials for the substrate include one or more of: glass, polyolefins like polypropylene, polystyrene, and other smooth materials.

In some preferred embodiments, a form of a polymerizable mixture droplet receiving substrate represents a shape of one side of a resulting (non-hydrated) ophthalmic device, e.g., the substrate may include at least a portion that is arcuate or otherwise curved in a shape and size suitable for a contact lens fitting a human eye. Similarly, a substrate may include apportion that is relatively flat fan din a size and shape suitable for an intraocular lens insertable into a human eye via surgery.

A size of the substrate is preferably adjusted to fit a required dimension of a finished hydrated ophthalmic device. A substrate with a rotational axis may be formed by one or more of: lathing, grinding, injection molding, and additive manufacturing. A substrate that is not constrained to shapes with a rotational axis may be prepared, for example, via 3D printing. A substrate may therefore include an optical surface shape that is not spherical, such as a substrate surface shape duplicating, modeled after, or based upon a portion of a patient's eye exposed to air.

In some embodiments, in order to adjust wettability of a surface of a substrate that will receive polymerizable mixture, a surface of the substrate may be pre-treated with one or more of: a surfactant; exposed to UV; exposed to ozone; and exposed to plasma treatment; or a combination of such treatments. In some preferred embodiments, a receiving surface of a glass or polymer substrate may be pre-treated with Tween® 80 or a silicone surfactant such as Dow Corning™ Additive 67, Additive 14, Additive 57, Xiameter OFX-0193 etc. In some implementations of the present invention, a surfactant is included in the polymerizable mixture.

In some embodiments, a method of manufacture of an ophthalmic lens includes bringing an oxygen concentration in the substrate into equilibrium with an oxygen concentration in the controlled atmosphere. Similarly, in some preferred embodiments, an oxygen concentration in the substrate is the same or less than an oxygen content of a polymerizable mixture deposited on the substrate.

In order to obtain an oxygen concentration in the substrate which is in equilibrium with the oxygen concentration in the controlled atmosphere, the substrate may be allowed to be exposed to the controlled atmosphere (or a corresponding atmosphere) prior to the deposition of the droplets, e.g., for a period of at least 8 hours.

In some embodiments, a substrate may only be capable of a limited amount of oxygen within it, hence, it may not be necessary to take any particular precautions with respect to the oxygen concentration in the substrate.

In an alternative embodiment, the substrate is in itself an ophthalmic device (such as, for example, a regular commercial contact lens), that is modified by the methods described herein so as to form a final ophthalmic device, such as, for example an ophthalmic device modified to have one or more of: different optical properties; an ophthalmic device with modified color patterns; and an ophthalmic device with different physical properties.

Controlled Atmosphere

In some embodiments, an ambient atmosphere in which the deposition printing described herein takes place may be controlled. A controlled ambient atmosphere may include, by way of non-limiting example, one or both of: defined ranges of a specified gas, defined ranges of particulate and controlled wavelengths of light or other energy wavelengths. In some preferred embodiments, a suitably low concentration of oxygen is achieved in an atmosphere encompassing the polymerizable mixture such that an oxygen content of the polymerizable mixture is appropriately controlled. In some embodiments, the receiving surface of the substrate may be contained within the controlled ambient atmosphere.

By way of specific non-limiting example, in some embodiments, a controlled atmosphere has an oxygen concentration of at the most 5.0 volume-%. In some embodiments, such as those including etafilcon A as an ophthalmic lens material, an oxygen concentration in a controlled atmosphere is at most 2.0 volume-%, e.g., 0.01-2.0 volume-%, such as 0.03-1.5 volume-%, e.g., in the range of 0.05-1.2 volume-%, such as 0.1-1.1 volume-%, and more preferably at the most 1.0 volume-%. The lower limits (such as 0.01%, 0.03%, 0.05% etc.) are stated for practical reasons and it is quite possible to achieve even lower concentrations.

In another aspect, in some embodiments, a controlled atmosphere under which deposition of a polymerizable mixture takes place is most conveniently at a pressure of 1.0 atm. (1013 mbar) which corresponds to an oxygen concentration of 21 volume-%. A lower oxygen concentration than the 21 volume-% found in a normal atmosphere may suitably be obtained by mixing of atmospheric air with another gas, such as, in some preferred embodiments, an inert gas such as, one or more of: nitrogen, helium, argon, or other inert gas.

In some embodiments, a controlled atmosphere may include an inert gas, such as nitrogen, mixed in specific amounts with pure oxygen. One preferred approach for controlled atmosphere uses nitrogen as the inert gas to displace atmospheric oxygen and thereby achieve an oxygen concentration of a desired level.

An oxygen concentration may be monitored by an oxygen meter and regulated at one or more of: prior to an additive manufacturing process, at a start of an additive manufacturing procedure, and during the manufacturing procedure and preferably also intermittently or continuously controlled during a process preparing one or both of: an optical element and a substrate.

Depositing Additive Droplets and Curing

The methods of the present invention include depositing successive passes of a plurality of droplets of a polymerizable mixture onto a receiving surface that may include one or more of: a substrate, an insert, and previously deposited droplets, under a controlled atmosphere. The droplets of polymerizable mixture are preferably emitted from a printhead and deposited based upon a two-dimensional pattern representative of an energy transmissibility pattern, such as a grayscale image (or other light map representing light intensity). Following a deposition of droplets of the polymerizable mixture, the droplets may be exposed to controlled amounts of actinic radiation to cause a gelation process that pins the droplets of polymerizable mixture in place relative to the substrate.

A polymerizable mixture is typically deposited using a 3D printing device, such as, for example, the printing devices described herein. In embodiments, individual droplets have a volume of 0.5-50 pico liters (pL), such as 1-40 pL or 1.5-30 pL, and preferably 2.0-15 pL.

In some embodiments, each plurality of droplets of the polymerizable mixture is deposited onto a surface relative to a substrate. The surface relative to the substrate may include one or more of: an upper surface of the substrate; droplets previously deposited; and an article placed upon one or both of the substrate and the previously deposited droplets of polymerizable mixture. Polymerizable mixture that is deposited onto previously deposited polymerizable mixture may integrate into previously deposited polymerizable mixture such that a single mass of polymerizable mixture forms on the substrate with no discernable layers. The single mass of polymerizable mixture may include multiple optical interfaces and/or sub-optical elements formed by respective series of one or more steps of: deposition, integration, melding, gelling, and pinning of polymerizable mixture.

Droplets of polymerizable mixture deposited upon an article may attach to the article. The article may have a surface treated with a wetting agent. After coming into contact with the receiving surface, the polymerizable mixture may subsequently be exposed to limited actinic radiation or heat after the deposition of the final of the successive layers of droplets for forming the ophthalmic device.

In variations of the present invention where successive layers of deposited polymerizable mixture are exposed to actinic radiation (e.g., UV light), the polymerizable mixture may include a photo-initiator. In the variants of the present invention where the polymerizable material deposited in successive passes are exposed to heat, the polymerizable mixture may include a thermal initiator.

In some variants of the present invention, successive patterns of polymerizable mixture are exposed to intermittent radiation (e.g., UV light) after each deposition of a layer of droplets of the polymerizable mixture. A degree of polymerization obtained by such intermittent exposure to actinic radiation is typically the degree required for the purpose of pinning, or otherwise obtaining gelation of, the polymerizable mixture. Such obtaining of gelation may be used to control migration of deposited droplets from a first position on the receiving surface to another position on the receiving surface (and/or to control migration of the deposited polymerizable mixture off of the receiving surface).

In preferred embodiments, such control of migration allows for limited flow of deposited polymerizable mixture, but prevents unmitigated rearranging of the deposited polymerizable mixture. For example, in some embodiments, controlled migration allows gravity and other natural forces, such as surface tension and/or intermolecular forces to coalesce and smooth a surface of deposited polymerizable mixture. Deposited polymerizable mixture will also integrate deposited droplets with previously deposited polymerizable mixture, and meld into a smoothed surface of polymerizable mixture that may then be pinned in place with a gelation process.

In some embodiments of the present invention, droplets of polymerizable mixture are deposited onto a surface that includes one or more of the substrate, an insert, and previously deposited polymerizable mixture, thereby forming a pattern of polymerizable mixture with energy transmissibility properties based upon an integer map representing energy transmissibility. The integer map representing energy transmissibility may include a two-dimensional grayscale image that is referenced by a software program used to control the printhead and make the printhead operative to dispel droplets of polymerizable mixture.

Deposited polymerizable mixture is preferably exposed to pinning actinic radiation after each pass (or after a predetermined number of passes) of the printhead depositing the polymerizable mixture, and ultimately exposed to curing actinic radiation after a deposition of a final pass of a printhead depositing droplets polymerizable mixture to form the optical element.

A pass of the printhead may include one or both of: the printhead moving relative to a substrate onto which polymerizable mixture is received, a substrate and previously deposited polymerizable mixture) moving relative to a printhead; and/or a printhead and a substrate moving relative to each other as the polymerizable mixture is deposited.

In some preferred embodiments, at least a portion of a pattern of polymerizable mixture deposited via a pass subsequent to a first pass of the printhead, combines with, and integrates into, previously deposited polymerizable mixture, thereby forming a single volume of polymerizable mixture. Gravity induces a limited movement of the deposited polymerizable mixture resulting in a smoothing of the surface of the deposited polymerizable mixture. Movement of deposited polymerizable mixture based upon gravity may be limited by surface tension forces and micro forces. Preferably the single volume of polymerizable mixture is pinned and/or gelled by exposure to a limited amount of actinic radiation thereby limiting additional movement following the smoothing effect of gravity induced movement.

In some variants of the present invention, a series of successive passes of a printhead, such as, for example, between two to twenty (2-20) passes of polymerizable mixture are deposited before exposing the deposited polymerizable mixture to intermittent actinic radiation that is effective to pin and/or gel the deposited polymerizable mixture. Prior to exposure to the intermittent actinic radiation, the deposited polymerizable mixture may undergo limited migration as a single volume of polymerizable mixture.

In some embodiments, a thickness of polymerizable mixture deposited in a pass of the printhead relative to a receiving surface, on any particular portion of the receiving surface, may be up to 50 μm (fifty micrometers), but preferably a maximum of 25 μm (twenty-five micrometers). Some embodiments may include up to 10 μm of polymerizable mixture deposited in a single pass of the printhead relative to the receiving surface (which may include one or more of: a substrate, previously deposited polymerizable mixture, an insert, and a formed ophthalmic lens).

In some variants of the present invention, a polymerizable mixture includes a plurality of photo-initiators, with two or more photoinitiators having responsiveness to different wavelengths of actinic radiation. This is particularly interesting when it is desirable to utilize UV light at one wavelength for the intermittent exposure (for pinning or gelation) and another wavelength for final curing of deposited polymerizable mixture to form the optical element. Accordingly, in some variants of the present invention, a first polymerization initiator is used (in conjunction with exposure to an appropriate first actinic radiation) to create a construct of partially polymerized polymerizable mixture, and a second polymerization initiator is used (in conjunction with exposure to an appropriate second actinic radiation) to complete a curing process.

In addition to controlling a level of oxygen in the polymerizable mixture to within a desired range of oxygen content, some embodiments of the present invention include controlling polymerization of the deposited polymerizable mixture such that as an optical element is being fabricated using the processes described in this disclosure, a degree of polymerization of deposited polymerizable mixture within a specified timeframe following deposition is limited to a degree of gelation to stop, or substantially slow, a movement of the polymerization mixture while allowing droplets from subsequent passes to meld into previously deposited polymerizable mixture and form a structure for an optical element with limited distortion.

A process for intermittent gelation may sometimes be referred to as pinning or gelling of the deposited polymerizable mixture. In some variants of the present invention, a pinning process may include applying a dose of actinic radiation in an intensity, wavelength, and length of time suitable to cause gelation, such as, for example, application of ultraviolet (UV) light to a UV curable polymerizable mixture and/or ink (UV ink). Actinic radiation wavelengths may be matched to photochemical properties of a polymerizable mixture and/or UV ink used in a manufacturing process. The actinic radiation may be any radiation that produces a desired photochemical activity, which in this case is polymerization of the polymerizable material.

As a result of the intermittent gelation, deposited polymerizable mixture and/or ink droplets move to a higher viscosity state, but stop short of full cure. Variants of the present invention that include pinning or gelation (or gelling) have enhanced ability to manage a flow and form of deposited polymerizable mixture, which in turn provides high optical qualities in an optical element formed via final cure of the deposited polymerizable mixture. For example, sufficient flow to allow gravity and/or other natural forces, such as, without limitation: surface tension and microforces to smooth a surface of the gelled polymerizable mixture but not significantly change a shape of an optical element is preferred. In some variants, other forces, such as for example, centrifugal force may be used to form a surface shape.

Processes for gelation and cure may be modified based upon a selection and/or a concentration of one or more of: photo-initiators, cross-linkers, source of actinic radiation (e.g., UV light source), intensity of actinic radiation and duration of exposure. Examples of sources of actinic radiation may include light emitting diodes (LED) or light bulbs, lasers, and other emitters.

In some specific embodiments, a polymerizable mixture may include two photo-initiators absorbing energy at two different wavelengths. The polymerizable mixture is used with corresponding UV LED light sources (e.g., at 365 nm and at 400 nm). One initiator may be present in a concentration capable of starting gelation of the polymerizable mixture but insufficient to complete the polymerization. This enables individual deposits of polymerizable mixture to come to a same (or similar) relative degree of conversion prior to final cure. A final polymerization throughout an article formed by multiple subsequent depositions and pinning of polymerizable mixture (e.g.; an optical element) may be done as a separate step using another photo-initiator/UV LED light combination (e.g.; second photoinitiator's actinic radiation energy, or third photoinitiator's etc.) actinic radiation energy resulting in a uniform polymer network required for optical function.

As an alternative hereto, a thermal initiator that is active at or above a Tg may be used instead of, or in addition to, the second (or other) photo-initiator to complete curing of the deposited polymerizable mixture. The present invention also provides that without control of an oxygen content of deposited polymerizable mixture throughout deposition process steps, and during a final curing step, the oxygen inhibition effects would adversely impact the uniformity of the polymer network and may lead to creation of incompletely cured polymer and therefore a device with a tacky surface.

In some embodiments, a polymerizable mixture is deposited onto a curved surface, a first deposition, or multiple depositions, may be deposited as patterns of droplets of polymerizable mixture onto a curved surface, according to the methods described herein. The patterns of droplets include a volume and distribution that permits surface tension to maintain the patterns of droplets of polymerizable mixture with limited flow or other movement until partially cured with a gelation process, thereby pinning the deposited polymerizable mixture in place (and limiting flow).

Subsequent deposition of additional droplets from the printhead may fill in spaces left by a first deposition or subsequent layers until a surface of a receiving substrate is completely covered with polymerizable mixture and the deposited polymerizable mixture establishes a foundation to build an optical element upon. Alternatives to dot patterns include deposition of droplets to form a very thin layer (e.g.; 1 micron to 8 microns) and building an optical element upon such very thin layer with the processes disclosed herein.

In some embodiments, it is useful to isolate a printhead containing monomer from receiving actinic radiation, such as UV radiation in order to prevent premature gelation or polymerization of monomers in a printhead which may render the printhead inoperable, or operable at diminished performance levels. Isolation from actinic radiation is particularly important when using reactive monomers with low levels of inhibitors and/or using a printhead in an environment with low oxygen levels. Isolation may be accomplished, for example, via physical separation of the printhead and actinic radiation.

In order to achieve concurrent printing and pinning of a material to stop or slow the movement of deposited ink or polymerizable mixture once deposited, some embodiments of the present invention include apparatus operative to isolate a source of actinic radiation (e.g., UV light source) from the printhead to essentially eliminate or substantially reduce a potential of gelation/polymerization of polymerizable mixture in the printhead. Isolating the printhead from a source of actinic radiation and controlling both oxygen levels and movement of polymerization mixture, enables the fabrication of precise shapes and optical devices without artifacts in the matrix that adversely affect an optical performance of a final lens that is fabricated.

In some embodiments, it is preferred that to wash gelled deposited polymerizable mixture with a solvent or water, e.g., to remove excess monomers, after multiple depositions of polymerizable mixture(s) and gelation processes have been completed, but before a final curing process is performed.

Referring now to FIG. 1, a side view 120A of a multifocal lens 120 with multiple optical interfaces that may result from sub-optical elements 121, 122, 123, 124 along a given optical path 128 through the multifocal lens 120. Each optical interface which may result from a sub-optical element 121, 122, 123, 124 will have an associated optical power such that a person (or automation) looking through the multi-focal lens 120 may ascertain an image conveyed as an energy pattern in the visible light spectrum modified by one of the sub-optical elements 121, 122, 123, 124. Typically, modification of an image conveyed as energy in the visible light spectrum is described as an optical power, such as a minus 2.0 diopter; plus 1.25 diopter; or 0 diopter (sometimes referred to as a plano lens). An optical interface resulting from a sub-optical element 121, 122, 123, 124 may be unique within the multifocal lens 120 or repeated at different sub-optical elements 121, 122, 123, 124. A diopter may generally be considered to refer to a unit of refractive power that is equal to a reciprocal of a focal length (usually in meters) of a given sub-optical element 121, 122, 123, 124.

A person looking through the multifocal lens 120 along an optical path 125-128 may neurologically select an image as modified by one (or more) sub-optical element 121, 122, 123, 124.

In a healthy person with fully functional eyes, a state of the person's ciliary muscle will change when the person observes distant or close objects. When looking at a distant object, the ciliary muscle relaxes, the zonular fibers are tightened, and their lens is flattened. In this state the refractive power of the person's natural lens is enough to form an image of the focused object on the retina. To focus on a close object, inner structures of the eye adapt through a process of accommodation, which may be referred to as the accommodation reflex.

An accommodation reflex typically includes one or more of three responses: a) increase of the curvature of the lens; b) constriction of the pupil; and c) convergence of the eyes. During normal sight of a person in optimal ocular health, accommodation will cycle through the three responses. The cycling will quickly present multiple optical variations of energy in the visible light spectrum to the retina and optic nerve. A person will neurologically ascertain an image presented as the image to consciously register with the brain. Normal biological progression (such as via aging) limits each person's accommodation reflex and therefore limits optical variations of energy in the visible light spectrum presented to the person's optic nerve.

The present invention simultaneously presents multiple optical variations of energy in the visible light spectrum to the optic nerve. The simultaneous presentation of multiple optical variations of energy in the visible light spectrum to the optic nerve does not exactly replicate a human accommodation reflex since simultaneous presentation of multiple optical variations of energy does not involve physical motion. However, the simultaneous presentation of the multiple optical variations of energy in the visible light spectrum to the optic nerve allows a person to neurologically select an image presented as the image to consciously register with the brain in a fashion that is very similar to neurologically selecting an image from a sequence of images normally presented in a vision progression.

On a high level, a normal reflex pathway in a healthy person with functional accommodation may generally be considered to include: the optic nerve, visual and frontal cortex, oculomotor and accessory oculomotor nuclei and oculomotor nerve (CN III). In need of accommodation, the optic nerve sends initial impulses to the primary visual cortex through the lateral geniculate body and the optic radiation. From here, an impulse travels to an accessory/Edinger-Westphal nucleus of the oculomotor nucleus in the midbrain, through a visual association cortex.

An action of ciliary muscle is instructed by parasympathetic fibers originating from the accessory/Edinger-Westphal nucleus of oculomotor nucleus in the midbrain. The contraction of this muscle loosens zonular fibers allowing the lens to relax. When the lens relaxes, the lens's degree of curvature increases, making it rounder. In this manner, a refractive power of a natural lens is increased allowing creation of sharply focused images of near objects on the retina.

A multi-focal lens provided herein allows for diminished functioning of the mechanical movement that is included as part of the accommodation reflex in a fully functioning healthy eye by simultaneously presenting multiple images to the retina and allowing the person to neurologically ascertain which image to cognitively process at a given moment in time.

Referring to top-down view 120B, in some embodiments, multiple disparate sub-optical elements 121-124 are formed by additive manufacturing processes that repeatedly apply a pattern of droplets (illustrated as a spherical pattern) with a different center point 132 position. Sub-optical elements 121-124 may be spherical or non-spherical, and may use the center point 132 or other calculated position for alignment. As illustrated, an offset of respective center points is exaggerated to emphasize relative positions of disparate sub-optical elements 121-124. In some exemplary embodiments, an offset may be between 100 nanometers and 1000 nanometers, and preferably between 400 nanometers and 600 nanometers, or between 40 microns and 60 microns.

Figure 1A:
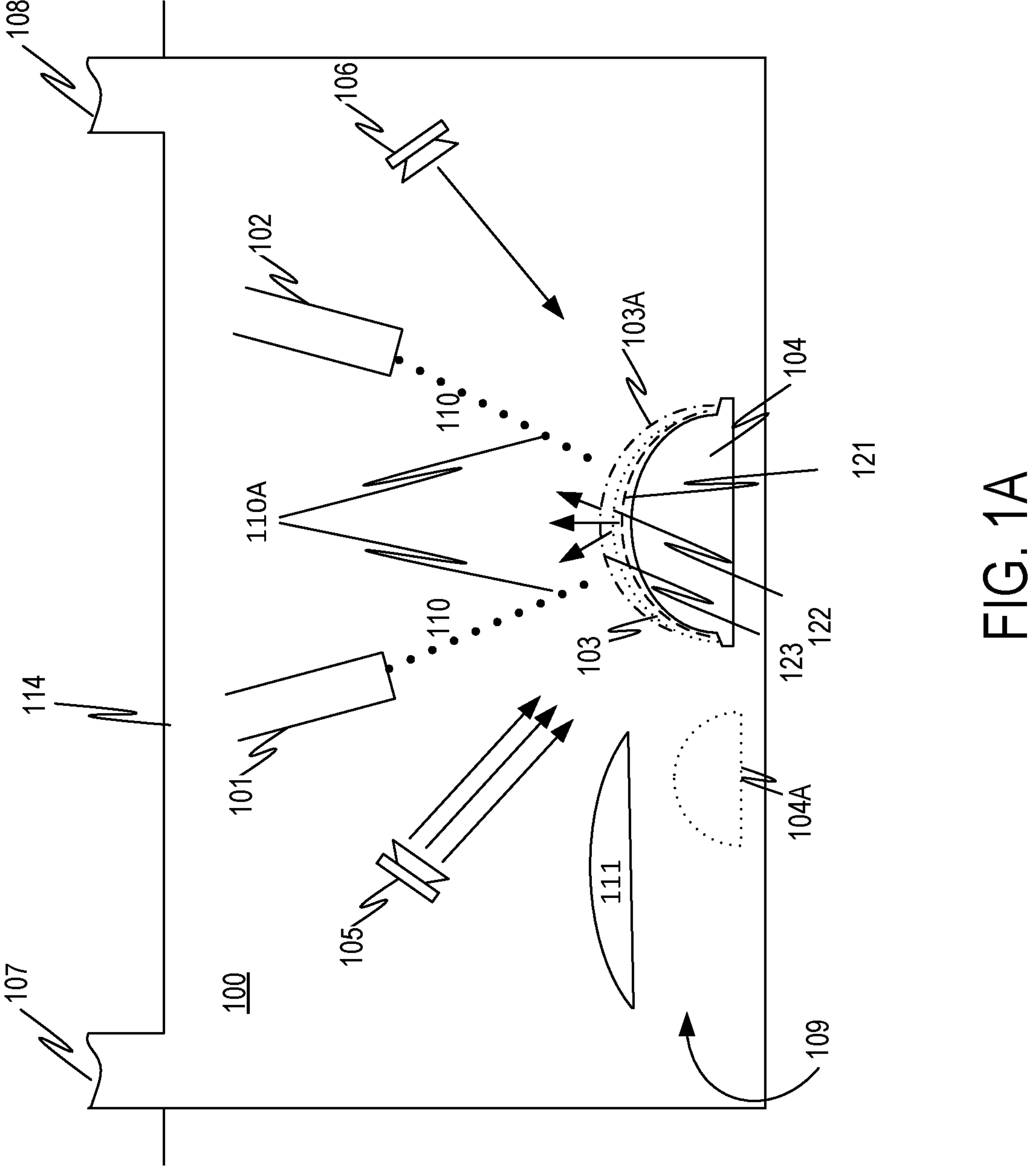
FIG. 1A illustrates an exemplary additive manufacturing apparatus that may be used in some implementations of the present invention.

Referring now to FIG. 1A, a schematic diagram illustrates an example of apparatus and underlying software forming an additive manufacturing system 100 with the, which when executed, the software makes the apparatus operative. As illustrated, the additive manufacturing system 100 includes one or more additive manufacturing print devices 101-102 that are operative to deposit droplets 110 of a polymerizable mixture 103 in a pattern of energy intensity and/or energy transmissibility (e.g., a grayscale pattern) onto a receiving surface 103A supported by a substrate 104. The deposit of droplets 110 may be accomplished, for example, via emitting a first volume of polymerizable mixture 110A in the form of droplets in a predefined pattern. A receiving surface for the droplets 110 included in the volume of polymerizable mixture 110A may include one or both of a receiving substrate 104 and previously deposited polymerizable mixture 103. Additional volumes of polymerizable mixture 110A, such as a second, third, and a desired number of additional deposits, such as, for example 12 to 22 volumes of polymerizable mixture 110A.

The receiving portion 104A of the substrate 104 may be smooth and arcuate in a manner making it suitable as a back curve of a contact lens. The receiving surface 103A may include one or both of the designated receiving portion 104A of the substrate 104 and previously deposited polymerizable mixture 103.

One or more actinic radiation source(s) 105 and 106 (which may contain LEDs emitting a same or different wavelengths of energy) receive control commands from one or more controllers 113. The controller includes a processor in logical communication with executable software commands stored on a digital storage. The executable software is executable upon command to operate the actinic radiation sources, and may also control relative movement of the additive manufacturing print devices 101-102 and a receiving surface 103A.

Some variants of the present invention include an enclosure 114 with one or more ports 107 and 108 for providing a controlled atmosphere 109 within the enclosure 114. The enclosure 114 may contain an atmosphere that is ambient to and encompassing one or more of: the substrate 104, print devices 101-102, droplets 110 polymerizable mixture (which are positioned to form an ophthalmic lens, such as a contact lens) from deposited polymerizable mixture 103 which has been built up on the substrate, and a source of actinic radiation 105-106.

In some embodiments, the substrate 104 may be positioned proximate to, such as beneath, at least one 3D printing device 101-102 (as used in this sentence, "proximate to" refers to a distance suitable for a dispensed droplet to be emitted from a print device 101-102 and be accurately placed upon the substrate). The relationship of beneath or underneath may derived from a direction of gravity. The print devices 101-102 are operative to dispense droplets of polymerizable mixture 110 onto a receiving surface 103A. The receiving surface 103A may include one or more of: a surface of the receiving portion 104A of the substrate 104; a surface of previously deposited polymerizable mixture 103; and a receiving portion of an insert, such as a rigid lens or an electronic device. The droplets are deposited in a pattern that reproduces an energy transmissibility pattern, such as a grayscale image. Successive depositions of the pattern are aggregated to form a volume of polymerizable mixture in a desired shape of a target optical element (e.g., see FIGS. 4,-5).

Following the application of the droplets of polymerizable mixture 110 to the receiving surface 103A to form a volume of polymerizable mixture 103, the polymerizable mixture may be exposed to a first dose (frequency, intensity and length of time) of actinic radiation (which will be in a first range of wavelengths and for a first duration of time and a first intensity (such as, for example, ultraviolet or blue light). In some embodiments, the first dose of actinic radiation may be supplied to the deposited polymerizable mixture via a first source of actinic radiation 105. Final cure can be accomplished via exposure of the aggregated polymerizable mixture to a second dose of actinic radiation (which includes a second range of wavelengths, a second duration of time and a second intensity) and may be sourced from a same source of actinic radiation 105 or different source of actinic radiation 106. Final cure will allow a formed article. The formed article, such as an ophthalmic lens 111, may be removed from the substrate.

In some variants of the present invention, a final cure process step may additionally be performed in an environment with a controlled temperature, such as, for example a temperature elevated above an ambient room temperature and/or a temperature maintained within a specified range.

According to some embodiments, a first printhead 101 of the system 100 may provide a first polymerizable mixture and a second printhead 102 may provide a second polymerizable mixture which may be compositionally the same or different from the first polymerizable mixture. One or both of the polymerizable mixtures may include functional additives or a non-polymerizable mixture (e.g., functional additives or solvents containing functional additives).

Ambient conditions within the system 100 may be controlled, such as, in particular with respect to an atmospheric gas (e.g., oxygen) content in a controlled atmosphere 109. In addition, in some embodiments, one or more of: temperature, ambient light, amount of particulate, size of particulate, circulation or other ambient atmosphere movement, and almost any variable that may affect one or more of: a movement of unpinned and unpolymerized deposited polymerizable mixture, polymerization of the deposited polymerizable mixture, and a shape of a device formed by polymerization of the deposited polymerizable mixture may be controlled.

In conditions where a substrate 104 is capable of transmitting actinic radiation or is transparent to actinic radiation, sources of radiation 105 and 106 may both, or either, individually or in alternate combinations, be located beneath or at an angle to substrate 104 as well as that shown in FIG. 1. In addition, a shutter or other actinic radiation shield may be located above or on a lateral side of a receiving surface. The shutter or other actinic radiation shield is positioned and functional to shield the printhead from actinic radiation or other actinic conditions.

The nature of the ambient gaseous environment can be controlled, for example, through the use of purging nitrogen gas though the inlets 107-108. Purging can be performed to increase or reduce oxygen partial pressure to predetermined levels.

Figure 1B:
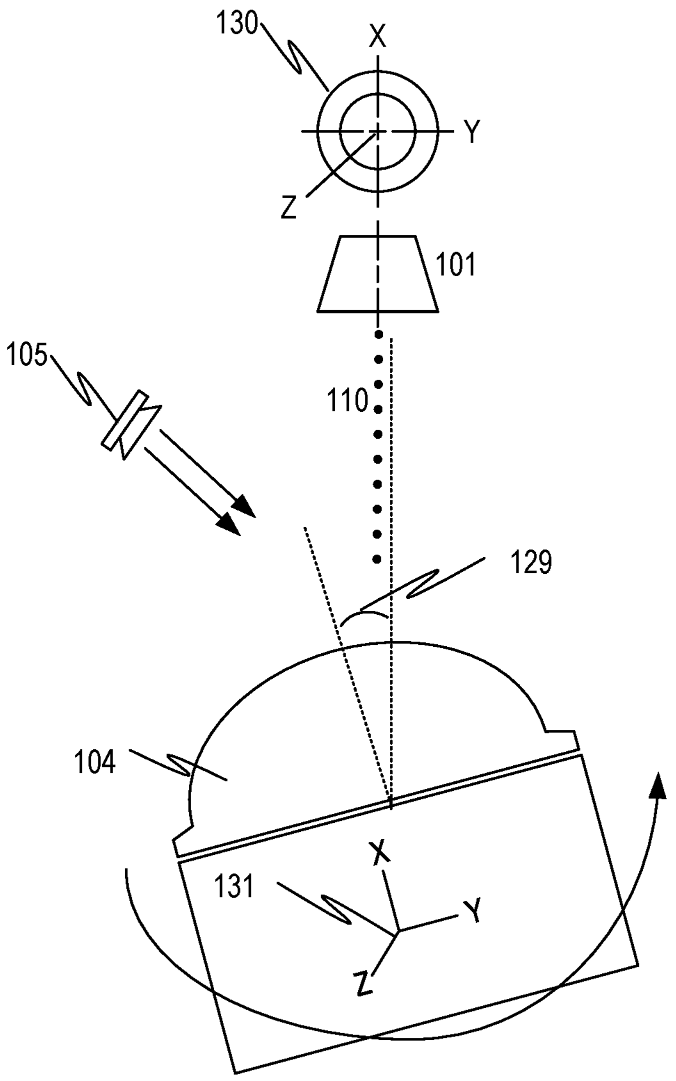
FIG. 1B illustrates a schematic diagram of mechanisms to introduce tilt into an additive manufacturing system.

Referring now to FIG. 1B, in some embodiments, disparate sub-optical elements 121-124 may be formed by emitting a same pattern of droplets during multiple passes of a printhead 101 relative to a receiving substrate 104 with a tilt 129 being introduced of the printhead 101 relative to the receiving substrate 104. A pass of the printhead 101 relative to the receiving substrate 104 may include movement of one or both of the printhead 101 and the receiving substrate 104.

In other embodiments, a tilt 129 is introduced via software adjustment to a pattern of droplets deposited. Additionally, in some embodiments, a pattern of droplets may be modified based upon a corneal topography. The corneal topography may be measured for example, with a SW-6000 corneal topographer by Suoer or an Atlas corneal topographer by Zeiss.

Preferably a tilt 129 is imparted after a conclusion of a pass of the printhead 101 relative to the receiving substrate 104. A tilt 129 may include, by way of non-limiting example about 500 nanometers (or fifty microns) of movement, plus or minus 20%. A tilt mechanism 130-131 may include a servo, a gimble, or other electro-mechanical or mechanical device capable of precise movement.

Figure 1C:
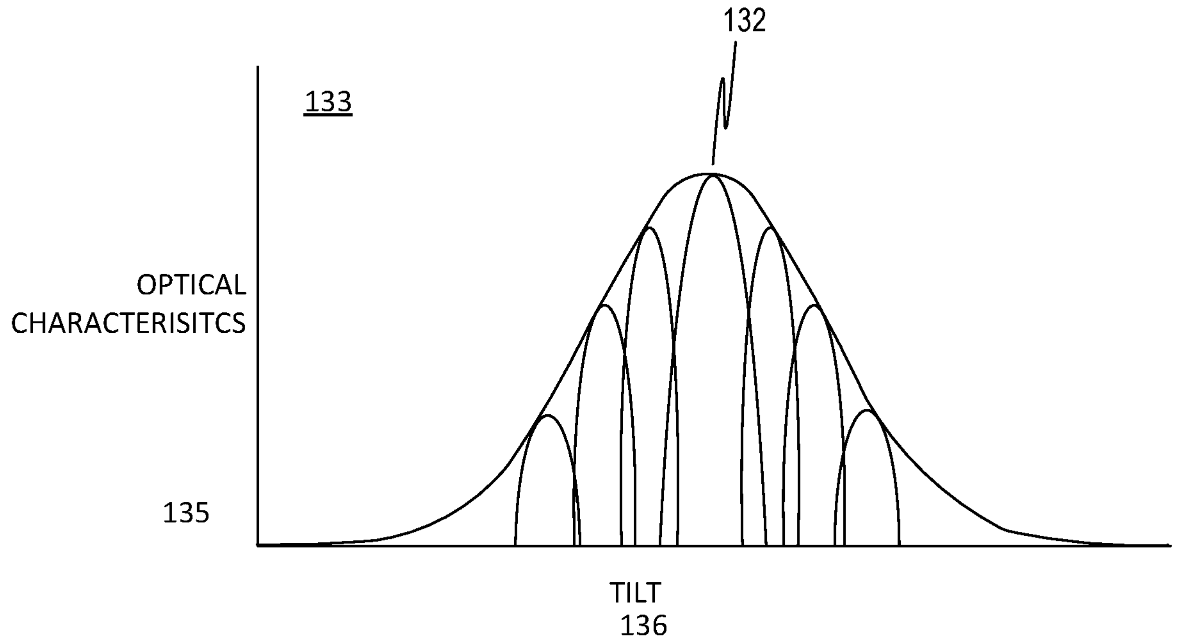
FIG. 1C illustrates an exemplary graphical representation of optical powers available in an optical path through an ophthalmic lens according to the present invention.

Referring now to FIG. 1C, a graph 133 illustrates an exemplary change in optical characteristic 135 relative to an amount of tilt 136 of a given pattern from a center point position 132.

Figures 1D, 1E:
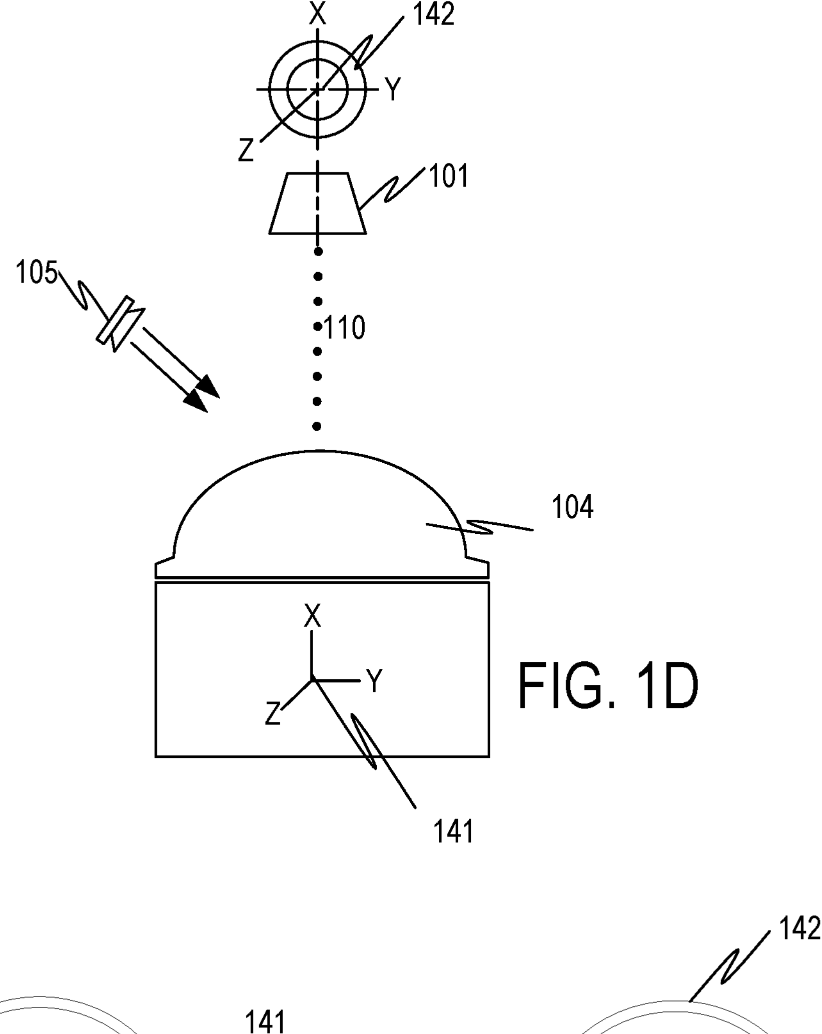
FIG. 1D illustrates a schematic diagram of a printhead relative to a receiving substrate.
FIG. 1E illustrates electro active devices for providing camber movement to one or both of a printhead and a receiving substrate.

Referring now to FIG. 1D, a schematic diagram illustrates a printhead 101 relative to a substrate 104 and dispensed droplets 110 of polymerizable mixture in the presence of a source of actinic radiation 105. One or both of the printhead 101 and the substrate 104 are in mechanical communication with a respective actuator 141-142. A substrate camber actuator 141 may be operative via that mechanical communication to provide an inclination or tilt to the substrate relative to a stream of dispensed droplets 110 and the printhead 101. Similarly, a printhead camber actuator 142 may be operative via mechanical communication with a printhead 101 to provide an inclination or tilt to the printhead 101 relative to a substrate 104 or other receiving surface (e.g., previously deposited droplets of polymerizable mixture that may have been pinned, or pre-polymerization).

Referring now to FIG. 1E, a substrate camber actuator 141 and/or a printhead camber actuator 142, which may include a servo 141-142, or multiple servos 141-142 in collaboration to provide camber movement or tilt to one or both of the substrate 104, and the printhead 101. The schematic illustration portrays the servos as a gimble to represent the multi-direction movement capabilities, however, any type of electro-mechanical, or electro device that provide appropriate movement may be used, such as for example, a shape memory alloy to other electro active material.

Figure 2:
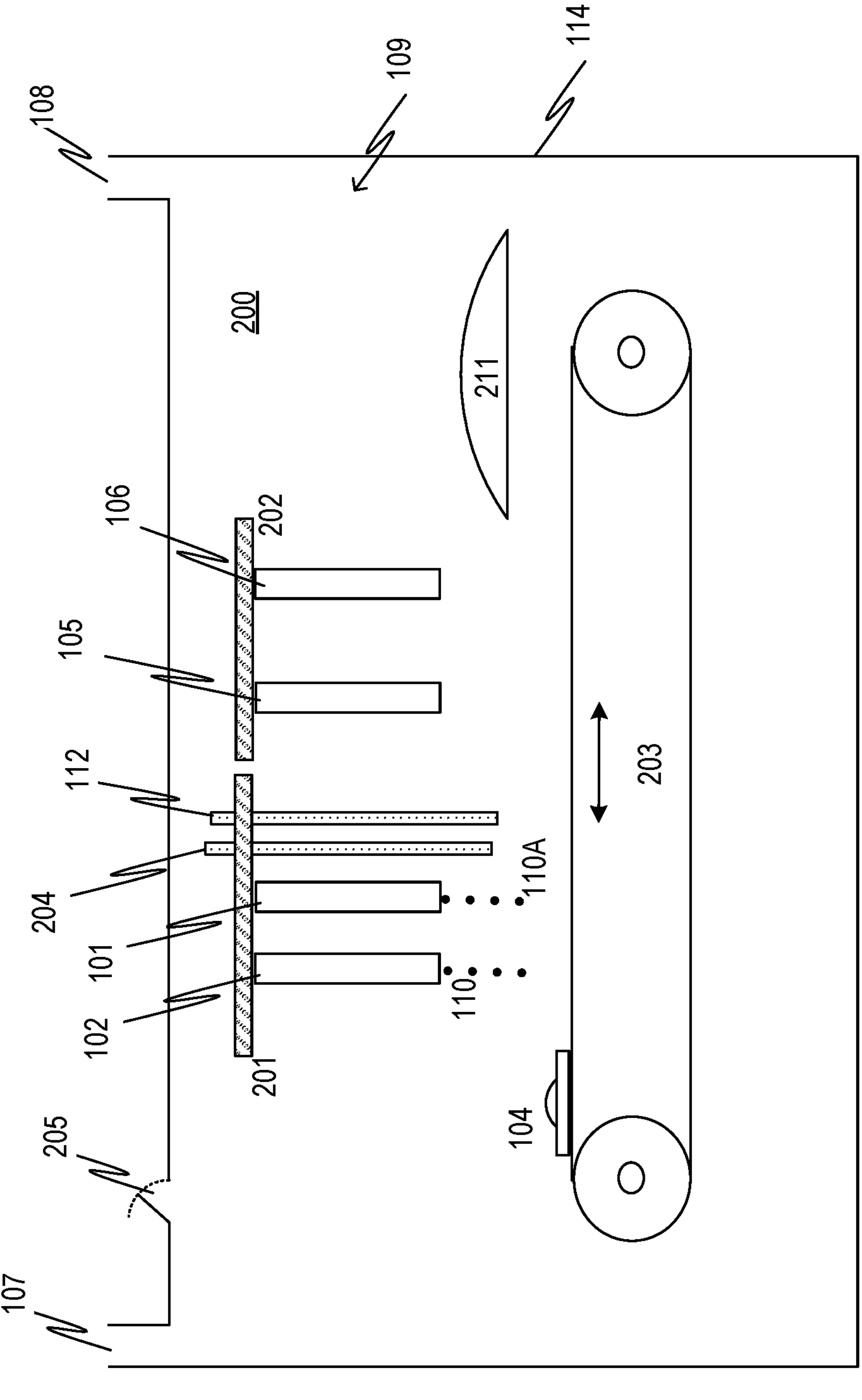
FIG. 2 is a schematic illustration of an alternative 3D printing apparatus according to some embodiments of the present invention.

Referring now to FIG. 2 a schematic diagram illustrates some alternative aspects that may be incorporated into a 3D additive manufacturing system 200. Some of same reference numbers are used as for FIG. 1 (e.g., 3D printheads 101-102, actinic radiation source(s) 105 and 106, substrate 104, an enclosure 114 with one or more ports 107 and 108, and a controlled atmosphere ambient to deposited polymerizable mixture 110). Additionally, the embodiments illustrated in FIG. 2 include an oxygen sensor 204, gate 205 for moving components in and out of the enclosure 114, a UV blocking screen 112 and an actuation structure 203 (e.g., a belt drive or stepper motor linear drive) configured to provide movement relative to the substrate 104 and the one or more 3D printhead 101-102 and/or movement relative to one or more actinic radiation source 105-106.

The 3D printing system 200 illustrated is similar to that of FIG. 1, as illustrated in FIG. 2, also includes one or more actuators 201-203 configured (and operative) to provide relative movement between the substrate 104 and the one or more of: the 3D printhead(s) 101-102; actinic radiation source(s) 105-106; and the actinic radiation source(s) 105-106, and in some embodiments, blocking screens 112 and/or enclosures. In some embodiments, a printhead actuator 201 is configured (and operative) to move one or more of the printheads 101-102 relative to the substrate 104. Similarly, a radiation source actuator 203 is configured (and/or operative) to move one or more actinic radiation sources 105-106 relative to the substrate 104. A substrate actuator 203 is configured (and/or operative) to move the substrate 104 relative to one or both of the printheads 101-102 and the actinic radiation sources 105-106. Although a belt drive 203A is illustrated as actuation structure 203 and a stepper motor track illustrated as actuation structures 201-202, other devices and apparatus are within the scope of the present invention. The actuation structures 201-203 may be synchronized such that relative movement between one or more of: the substrate 104, printheads 101-102, and actinic radiation sources 105-106 can be coordinated with deposition of polymerizable material 110 from the printhead(s) 101-102.

The processes presented herein may be practiced on the systems 100, 200 described to form an optical element 211. The process may include operation of one or more printheads 101-102 with a first printhead 101 dispensing droplets 110 of a first polymerizable mixture and one or more additional printhead(s) 102 dispensing droplets 110A of compositions that may include: a first polymerizable mixture, a second polymerizable mixture which is compositionally different from said first polymerizable mixture, and a non-polymerizable substance or mixture.

In some embodiments, one or more of: the first polymerizable mixture, the second polymerizable mixture, and the non-polymerizable mixture include one or more functionally active substance, such as, for example, a substance in dissolved form.

In the disclosure herein, ophthalmic devices (and/or contact lenses) are used for illustrative and discussion purposes, however the principles are applicable for the formation of articles of manufacture in general and the teachings presented may be broadly used in any optical element (or other article) for which precise dimensional shapes; optical properties; and/or similar uniform polymer properties are preferred, such as, for example, intraocular lenses.

According to the present invention, in some embodiments, a polymerizable mixture is delivered in the form of extremely small droplets of typically 1-15 picolitre amounts at high velocities through a gaseous atmosphere with relatively high surface to volume ratios. A large number of droplets (estimated to be between 1.5 and 9 million) are required to form a 25-milligram lens. In delivering each droplet to a proper place during manufacturing, several factors may be considered. The factors may include, but are not limited to, one or more of: exposure of the droplet to ambient process conditions; a thickness of a resulting layer of material when the droplets impact a surface comprising one or both of a substrate and previously deposited polymerizable mixture; an interaction with a receiving surface comprising the substrate and/or previously deposited polymerizable mixture, such as wetting of the receiving substrate surface and merging with the previously deposited polymerizable mixture; effects of impinging droplets; pinning via an exposure time to actinic radiation and/or atmospheric gases between subsequent layers of droplets of polymerizable mixture; and curing/polymerization of deposited polymerizable mixture.

During the additive manufacturing process. there is significant opportunity for exposure of the polymerizable mixture to (and uptake of) an ambient gas, such as oxygen, from one or more of: an ambient process atmosphere (sometimes referred to as a controlled atmosphere); a receiving substrate surface; and previously deposited droplets of polymerizable mixture; if such factors are not accurately controlled, surface and bulk properties of a resulting ophthalmic lens (including optical properties) will be adversely affected.

The influence of oxygen is particularly acute in lenses produced using hydrogel materials such as 2-hydroxyethyl methacrylate (HEMA) or other monomers used in soft contact lenses and soft intraocular lenses. In these materials, variations caused by exposure to oxygen are more obvious in a final cured lens after the lens has absorbed water. In preferred embodiments therefore, exposure to oxygen may be considered to have a negative influence.

Typically, surface or skin portions of a lens formed with more oxygen present contain more polymer network defects than a bulk portion allowing more water to be absorbed in the areas formed with more oxygen present. The resulting distortion in these skin regions usually has a negative impact on the overall mechanical properties (modulus, tensile strength, elongation), optical properties (light transmission, refractive index etc.), shape, and part to part repeatability.

The present invention teaches control of, and adjusting of an oxygen content of the polymerizable mixture in relation to the oxygen content of the controlled atmosphere (as described herein) in order for the effects of oxygen to be controlled to an extent that the properties of an optical element formed are not significantly impacted.

In those embodiments that include the formation of ophthalmic devices, (e.g., contact lenses; intraocular lenses; and spectacle lenses), the ability to create an optical prescription is highly dependent on precise shapes of curved surfaces. Producing these required surfaces on these and other non-ophthalmic optical elements can be achieved by using the principles claimed in this invention, thus enabling the benefits of using 3D deposition printing such as simplicity, efficiency, more degrees of freedom in design, lower time requirements, and costs.

In some embodiments, the influence of oxygen in the polymerization process and resulting oxygen impact on properties of an item formed are eliminated or substantially reduced. This enables improved control of the movement of the polymerization mixture post deposition during the formation of a polymer matrix in layers. This may be critical in the creation of curved, arbitrary, or irregular surfaces or shapes, and more so when creating complex optical devices requiring precise curved surfaces, including a surface incorporating multiple arcuate portions. Therefore, the combined effects of overcoming oxygen inhibition and controlling the movement of the polymerization mixture in optical product applications will likely reduce and even eliminate optical artifacts and distortions.

In some embodiments, the present invention provides apparatus and methods of operating the apparatus for three-dimensional deposition manufacture of an ophthalmic device in which a plurality of droplets of polymerizable mixture are deposited onto the surface of a substrate (and/or previously deposited polymerizable mixture) under a controlled atmosphere thereby forming a layer of polymerizable mixture into a pattern replicating a map of energy transmissibility (such as a grayscale image).

In some embodiments of the present invention, an oxygen concentration in polymerizable mixture may be adjusted in relation to one or more of: an oxygen concentration of the controlled atmosphere to which the polymerizable mixture is exposed; an oxygen concentration in other parts of the environment (such as, for example a substrate receiving droplets of polymerizable mixture) so that migration of oxygen from one source to the other is avoided or at least suppressed to a degree that is insignificant to the polymerization of the polymerizable mixture.

Release of the Ophthalmic Device from the Substrate and Post-Treatment

Following sufficient deposition of polymerizable mixture 103 to form an optical element 211 (e.g., ophthalmic device) and performance of a curing process, the optical element 211 is typically released from the substrate. It is preferable that the polymerizable mixture 103 deposited in a specific pattern to form the optical element 211 is sufficiently physically bound to the substrate 104 during preparation of the optical element 211 to prevent unwanted movement relative to the substrate 104, however, the polymerizable mixture 103 should not be bound so securely that removal of the optical element 211 from the substrate 104 damages the optical element 211. For example, in some embodiments, care should be taken that no covalent bonds are formed between the polymerizable mixture 103 and the substrate 104 during preparation of the optical element 211, including the curing of the polymerizable mixture 103.

The ophthalmic device 211 may be released (or otherwise removed) from the substrate 104 by physical means so as to be able to manipulate the optical element 211 in various ways. For example, the optical element may be manipulated via one or more of: washing the optical element 211 to remove by-products, soaking the optical element 211 in buffered saline, tinting, marking, and packaging the optical element 211. For example, in some variants of the present invention, such as when the optical element 211 is formed with a hydrogel polymer, the optical element 211 may be soaked with one or both of: water, and a solution, such as a buffered saline solution, sufficiently to cause the optical element 211 to expand. The expansion facilitates release of the optical element 211 from the substrate 104. A solution may also include one or more release agents. Release agents may include compounds, or mixtures of compounds, which, when combined with water, decrease a time required to release an optical element 211 from the substrate 104, as compared to a time required to release such an optical element 211 using an aqueous solution that does not include the release agent(s).

Although typically preferred, it is not strictly necessary that the curing of optical element 211 is completed before release from the substrate 104.

In some embodiments, after curing, the optical element 211 is subjected to one or more extraction process steps to remove unreacted components from the optical element 211. The extraction process steps may be executed using one or more of: conventional extraction fluids, organic solvents, alcohols; water (or aqueous solutions such as buffered saline). In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation, or both. The ophthalmic device may also be sterilized by known means such as, but not limited to, autoclaving and radiation sterilization. Sterilization may take place before or after packaging the optical element 211 in a suitable storage container, preferably after packaging. In some preferred embodiments, the optical element 211 is packaged in an aqueous solution.

For optical elements 211 formed with hydrogels, the packing may include packing in a physiological saline solution with around 0.9% sodium chloride and suitable buffering agents such as phosphate or borate buffer systems. In addition, the packing solution may include one or more functionally active substances including biologically active substances.

Aqueous solutions may also include additional water-soluble components such as release agents, wetting agents, lubricating agents, active pharmaceutical ingredients, vitamins, antioxidants and nutraceutical components, combinations thereof and the like. In some embodiments, the aqueous solutions comprise less than 10 weight-%, and in others less than 5 weight-% organic solvents such as isopropyl alcohol, and in another embodiment are free from organic solvents. Depending upon a composition of the aqueous solution. The aqueous solution may or may not require special handling, such as purification, recycling, or special disposal procedures.

In some embodiments, an aqueous content of a hydrogel optical element 211 includes at least 30 weight-% water, in some embodiments at least 50 weight-% water, in some embodiments at least 70 weight-% water and in others at least 90 weight-% water.

In variants of the present invention, a polymerizable mixture 110 comprises hydroxyethyl methacrylate (HEMA) monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture 110 comprises acrylate monomers not including HEMA monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture 110 comprises reactive silicone precursors, and the method comprises the subsequent step of swelling the optical element, preferably an ophthalmic device, in water, whereby the optical element obtains a water content from 5 to 70 weight-%, and preferably from 10 to 50 weight-%.

Novel Ophthalmic Devices

The methods and apparatus of the present invention enable the formation of an optical element 211 with previously unobtainable designs, such as, by way of non-limiting example, one or more of: a contact lens or intraocular lens with a non-rotationally symmetrical surface, with corresponding optical corrections, including very steep radii of curvature and very high spherical and cylindrical corrective components; a contact lens or intraocular lens including multiple spherical and cylindrical corrections within the same lens as opposed to a single spherical corrective power reflecting the power distribution map of the eye and not just the average corrective power of refractive power from a phoropter or refractometer; and a contact lens or intraocular lens capable of (due to non-rotational symmetry) correcting optical aberrations resulting from poor surgical outcomes of PRK or LASIK or LASEK surgery or from aberrations due to an unusual corneal surface.

Repetitive Grayscale Image Based Additive Manufacture

Figures 3, 3A:
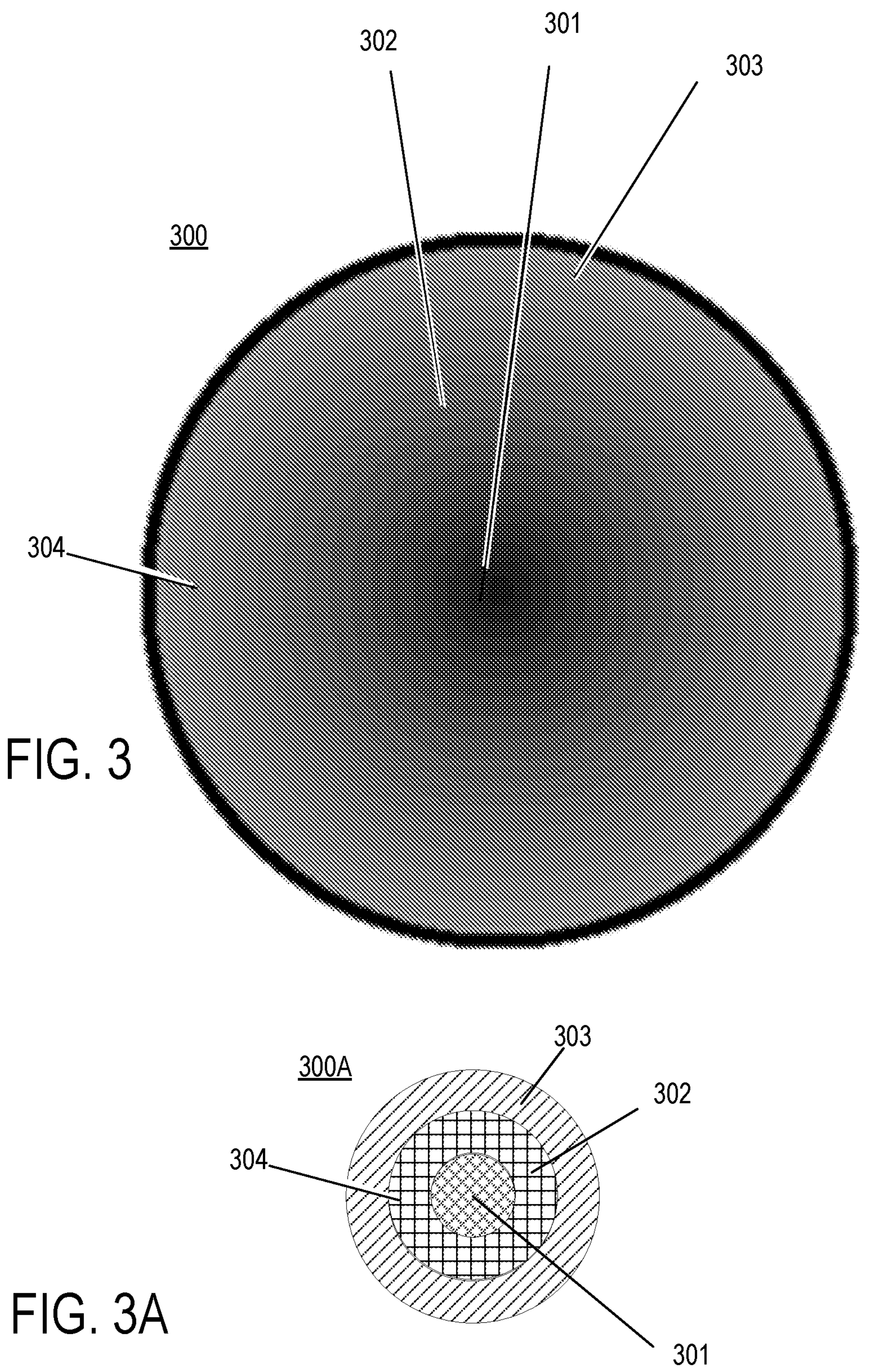
FIG. 3 illustrates an exemplary energy intensity pattern, represented as a grayscale image, which may be used to generate control protocols for 3D printing apparatus according to some embodiments of the present invention.
FIG. 3A illustrates a schematic diagram of an exemplary energy intensity pattern, represented as a grayscale image.

Referring now to FIG. 3, an exemplary energy transmissibility pattern, such as a grayscale image 300, may be used to create additive manufacturing control commands to control release of droplets of polymerizable mixture in a pattern that replicates the grayscale image 300.

For example, in some embodiments, a map of data that either directly or through conversion represents an amount of deposition of polymerizable mixture at a given location that corresponds with data values associated with pixels included in a grayscale image 300, such as, for example, an integer map. In other embodiments, a value associated with a pixel may be a float point or other expression of a whole number of a real number. The data values may correspond with an amount of energy transmissibility at a pixel location and the data values may be accessed electronically and a processor executing software commands may convert the data values to additive manufacturing printhead control commands. The printhead control commands are executable to control a deposition of a polymerizable mixture at locations that correspond to the pattern replicating the grayscale image 300 on a pixel by pixel basis. For example, a data value with a relatively larger digital number may correspond with a darker area of the grayscale image 300 and may correspond with an emission of a greater amount of polymerizable mixture from a printhead than an emission corresponding with a lighter area of the grayscale image. The greater amount of polymerizable mixture than a to a thicker deposit 301 and a value of a control command may be assigned by conversion of a grayscale value at the location of a thicker deposit 301 to a control command value of the printhead for a thicker deposit 301. Likewise, a lighter value included in the grayscale may correspond to a thinner deposit 304 and a value of a suitable printhead control command may be assigned by conversion of the lighter grayscale value to an appropriate control command value for a thinner deposit 304.

In some examples, the thicker deposit 301 may be formed by printing a relatively larger amount of polymerizable mixture on a particular location of a receiving surface during a pass of 3D printhead over the receiving surface being printed upon, and a thinner deposit 304 may correspond with printing a relatively lesser amount of polymerizable mixture at a position of a thinner deposit 304. A thicker deposit 301 may correspond with a relatively darker portion of a grayscale image 300 and a thinner amount 304 may correspond with a relatively lighter portion of the grayscale image 300.

Referring now to FIG. 300A, a schematic diagram illustrates the exemplary energy transmissibility pattern, such as a grayscale image 300, that may be used to create additive manufacturing control commands to control release of droplets of polymerizable mixture in a pattern that replicates the grayscale image 300. The schematic diagram illustrates a thicker deposit 301; an upper surface 302; an edge profile 303; and a thinner amount of deposit of polymerizable mixture.

According to the present invention, following each pass of the printhead and associated polymerizable mixture deposition, the deposited polymerizable mixture may be allowed to "sit" for a short period during which the material will be acted upon by physical forces, such as gravity, surface tension and microforces to modify surface characteristics. Modifying surface characteristics, may include, by way of non-limiting example, one or more of: leveling out high and low areas formed during the deposition process; smoothing a surface of the deposited polymerizable mixture; flowing deposited polymerizable mixture into interstitial areas; and form a uniform edge of deposited polymerizable mixture.

Essentially, the present invention allows for an upper surface 302 that is formed by physical forces existing in nature, as opposed to a manufactured surface, such as a mold surface and/or a lathed surface. Gravity will smooth an upper surface of deposited polymerizable mixture prior to the deposited polymerizable mixture undergoing a gelation process, such as, for example, the deposited polymerizable mixture being pinned by exposure to a controlled amount of actinic radiation.

In some variants of the present invention, a control command may be used to determine how many passes a 3D printhead has made over a receiving surface. A number of passes of the 3D printhead may correlate with a thickness of polymerizable mixture deposited and also correlate with an amount of energy transmissibility at particular locations of a pattern of deposited polymerizable mixture. In this manner, deposited polymerizable mixture may be deposited, pinned and ultimately cured in a shape and volume suitable to form an ophthalmic lens with desired ophthalmic qualities. Deposited polymerizable mixture achieves sufficient thickness and suitable shape by repeated application of a corresponding grayscale image.

In some variants of the present invention, each pass of the 3D printhead may print a pattern of polymerizable mixture corresponding with a same grayscale image, in other embodiments, a different pass of the 3D printhead may correspond with a different grayscale image than a previous pass. As mentioned previously, in some variants of the present invention, each pass of a 3D printhead depositing polymerizable mixture may be followed by exposures of the polymerizable mixture to a gelation process, such as an amount of actinic radiation, thermal activation, or the like, that is sufficient to partially polymerize the deposited polymerizable mixture. A curing process may be performed after a final pass of polymerizable mixture is performed. In various embodiments, a final layer may be exposed to a pinning step, and/or move directly to a full curing process.

Curing and/or pinning may be facilitated by inclusion of one or more photo initiators with the deposited monomer. Photinitiators may include, by way of non-limiting example, initiators activated by energy of or about 392 nM and 400 nM.

In some examples, an energy transmissibility pattern (e.g., a grayscale image) may be derived from an article in physical form that is processed, such as via an optical scanning process, image capture process, or photographing process, to capture the energy transmissibility data into an electronic form, such as, for example a digital data value, and the electronic form may be converted to control commands.

Some variants of the present invention include a grayscale image with a generally spherical shape, where the lighter values are associated with thicker deposits. Thus, a different conversion protocol may be assigned to different grayscale images depending on which values correspond to thick and thin deposits, respectively.

In some examples, a single grayscale image may be used to represent a desired product lens and its associated control commands. The single grayscale image is repeatedly deposited in successive passes of the 3D printhead, one pass following another until a desired optical quality is embodied in the deposited polymerizable mixture which may be cured to form an article that also meets physical parameters suitable for wearing on an eye of a patient.

In other examples, a series of grayscale images may be assembled to create multiple sets of control commands. The control commands may result in deposit of different shape designs and physically create an additive composite of the images. In other examples, multiple grayscale images may be combined and processed before any processing occurs. In some examples, a combination of multiple images may be normalized to correspond with upper and lower thickness factors.

In some examples, different features such as edge profiles 303, alignment features, and the like, may be programmed into an optical element command protocol by the addition of grayscale images to a lens profile.

In some examples, a refractive element may be designed at a location on a surface plane as an array of grayscale values, where the values correspond to an added thickness or range of thickness in the printing process. In a similar example, a constant grayscale value may equate to a plano lens element with no refractive power added to any underlying structure.

In some examples, a grayscale image may be referenced from numerous filetypes such as, by way of non-limiting example, one or more of: jpeg, tiff, bmp, png and the like, may be used to create a control command protocol to print a desired article, such as an ophthalmic lens article, by varying an amount of polymerizable mixture that is deposited at disparate locations thereby resulting in with more polymerizable mixture deposition in areas targeted for thicker deposits. The result of printing an entire pattern may result in an article with no interstitial areas.

In some variants of the present invention, a grayscale in an image or additive combination of images, may correspond to processing of multiple disparate passes of a 3D printhead, wherein an amount of polymerizable mixture deposited in specific locations and subjected to a pinning process before a next deposition pass is completed. A polymerizable mixture deposited during a printing process pass may be a monomer mixture with various included photo initiators. One of the photo initiators may be associated with a wavelength of actinic radiation exposure during an associated pinning processes. After multiple printing passes have been processed, an entire volume of polymerizable mixture deposited on a receiving substrate may be subjected to a curing process. In some examples, the curing process may be exposure to actinic radiation of a different wavelength and exposure time, intensity, and the like.

In another aspect, in some embodiments, a grayscale pattern or an energy transmissibility pattern may be dithered via a dithering process or algorithm prior to generation of a control command for the printhead based upon the grayscale or energy transmissibility pattern in order to generate a smoother image deposited via expulsion of droplets from the printhead and accumulation prior to curing. Dithering may include, way of non-limiting example, processes consistent with Floyd-Steinberg, Burkes, Sierra, Two Row Sierra, Jarvis, Stevenson, Arce, or other process.

Figure 3B:
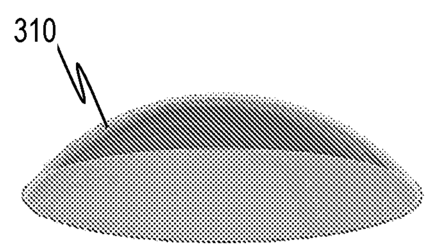
FIG. 3B illustrates a schematic diagram of a traditional 3D printing process.
Figure 3B:
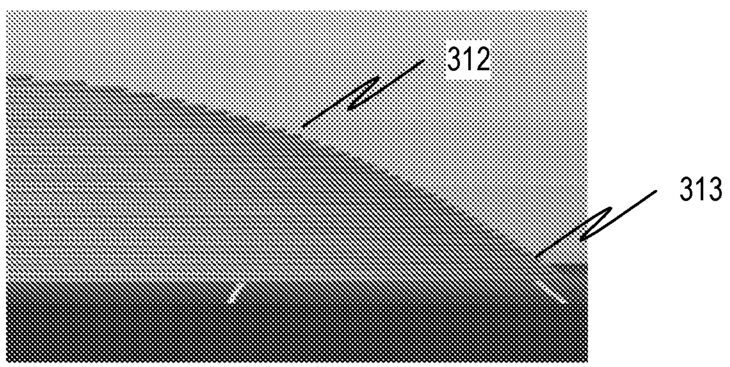
Figure 3B:
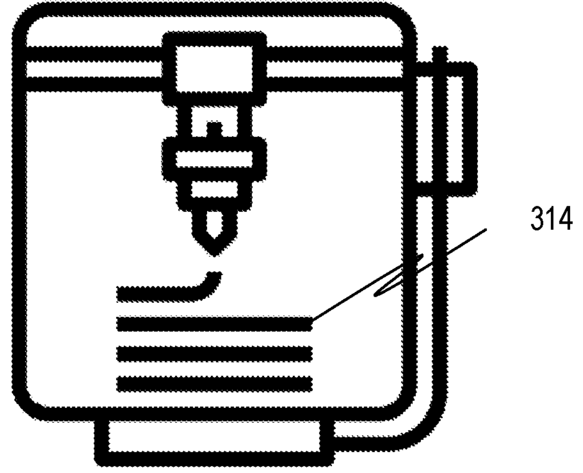

Referring now to FIG. 3B, a schematic diagram illustrates how a traditional 3D printing process may approach manufacturing of an optical lens. As illustrated in FIG. 3B, a lens model 310 is designed to include desired lens features. The lens model 310 is parsed into slices 312-313. Each slice may include, for example, disparate horizontal segments. Each slice may then be printed layer by layer, one upon another.

Figure 3C:
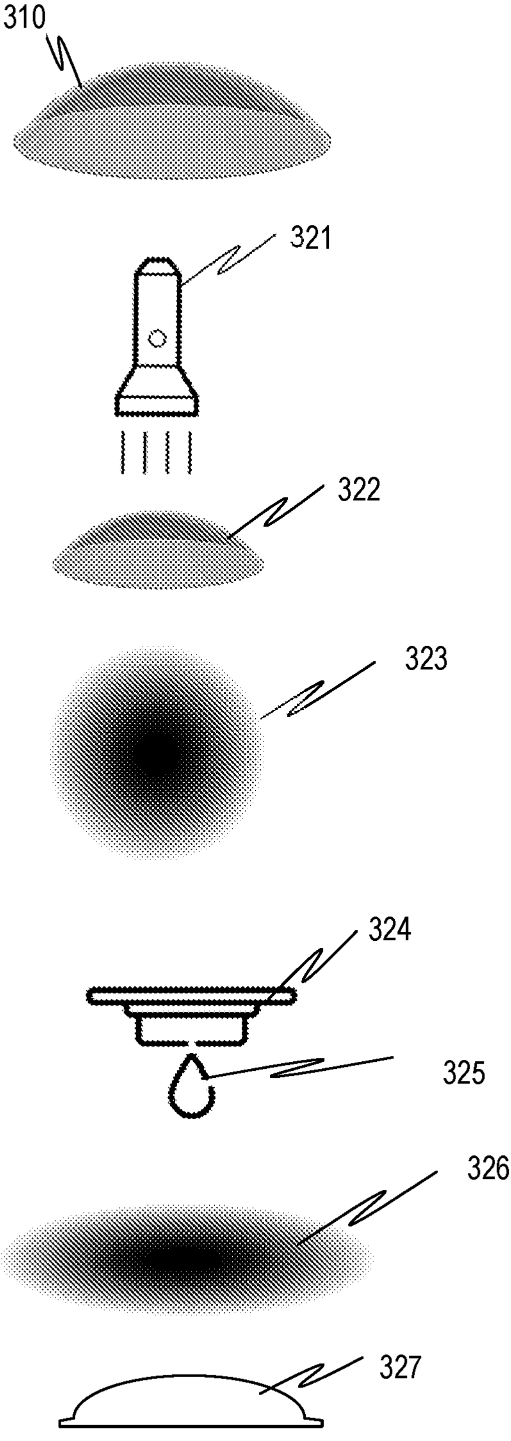
FIG. 3C illustrates a schematic diagram of process steps according to the present invention.

Referring now to FIG. 3C, a schematic diagram illustrates exemplary steps that may be executed in practicing the present invention. A lens model 310 is designed and includes desired lens features. An energy transmission map 323 is created that is representative of how an energy spectrum 321 (such as, by way of non-limiting example, a portion of the light spectrum corresponding with visible light) is to pass through a generated lens 322. According to the present invention, the energy transmission map 323 is deposited as a respective volume of polymerizable mixture 325 multiple times onto a receiving surface 327. A portion of a volume of polymerizable mixture may integrate with one or more portions of previous volumes of polymerizable mixture that have been deposited to generate an integrated composite of polymerizable mixture 326.

Figure 4:
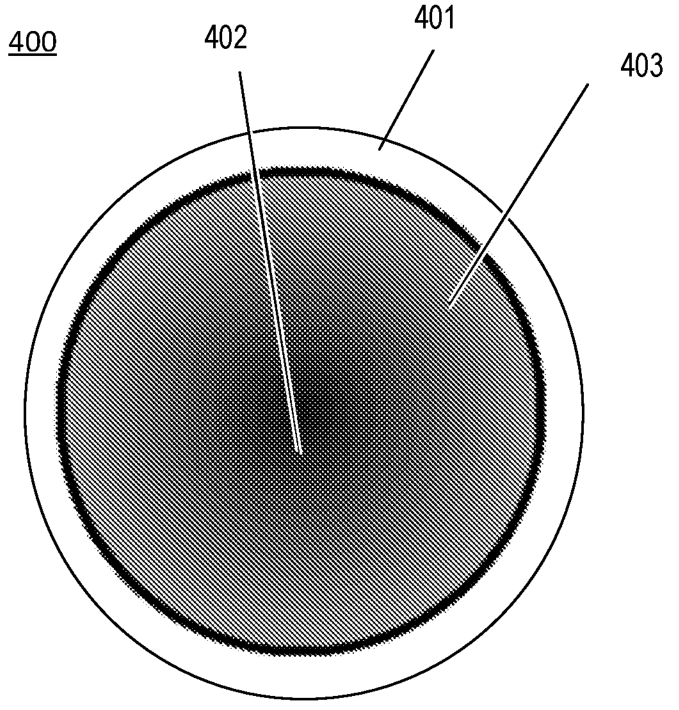
FIG. 4 is a schematic illustration of a spherical lens with an identified periphery portion according to some embodiments of the present invention.

Referring now to FIG. 4, an optical element 400 is illustrated according to some embodiments of the present invention. The optical element 400 includes a periphery portion 401 that may be printed or otherwise formed before an optical zone portion 402 of the optical element 400. A lens carrier portion 403 may transition the optical zone portion 402 and the periphery portion 401. The carrier portion 403 is preferably of a size and shape conducive to comfortably maintaining a completed lens in place on a wearer's eye. During additive manufacturing of the optical element 400, polymerizable mixture included in the periphery portion 401 may be deposited and pinned, but not fully polymerized, before the polymerizable mixture included in the optical zone portion 402 is printed and pinned. In some preferred embodiments, the periphery portion 401 may include a greater mass so that as the polymerizable mixture cures into a polymer, stresses resulting from the polymerization process will not deform the optical zone portion 402 due to stabilizing influence of the greater mass of the periphery portion 401.

In some embodiments, the periphery portion 401 may remain with the optical element 400 and form a comfortable edge feature. In other embodiments, some or all of a periphery portion 401 may be removed, such as, for example via laser trimming.

Embodiments that include a higher mass periphery zone portion 401 may be formed via the steps of: a) printing or otherwise depositing polymerizable mixture in the periphery zone portion (which, for a spherical lens may have a generally annular, and other lenses a corresponding perimeter shape such as an oval shape or almond shape); b) pinning the polymerizable mixture in the periphery zone portion 401, wherein pinning will preferably occur after each pass of a print head depositing monomer; c) printing or otherwise depositing polymerizable mixture in an optic zone; pinning the polymerizable mixture in the optic zone; and curing the deposited polymerizable mixture. Some embodiments may additionally include placing a cap in the optic zone to provide an optic quality.

Figure 5:
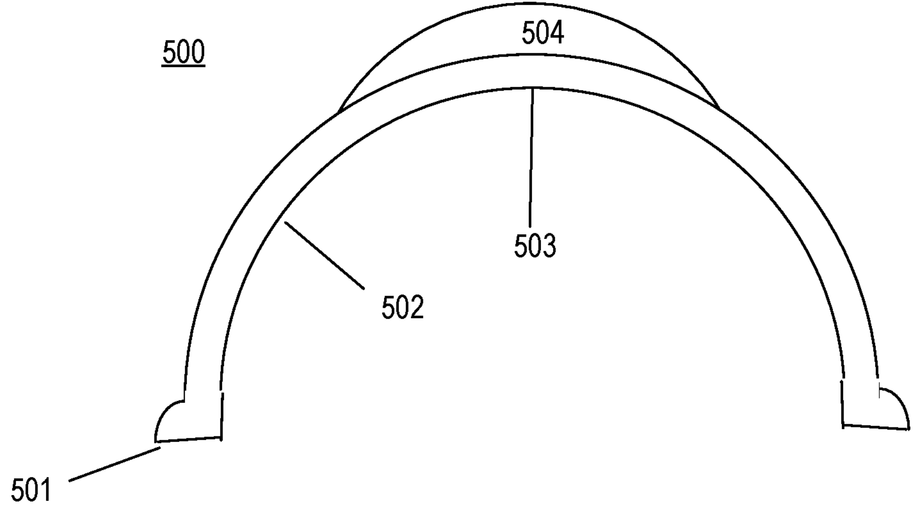
FIG. 5 is a schematic illustration of a profile cutaway view of a lens with a periphery portion and a carrier portion supporting an optic zone, according to some embodiments of the present invention.

Referring now to FIG. 5, a profile cutaway view with a periphery portion 501 and a carrier portion 502 supporting an optic zone 503 and an optic insert or cap 504. In some embodiments of the present invention, the periphery portion 501 may include a higher mass than a carrier portion 502 and/or optic zone 503 portion of the lens 500.

Axial Thickness Profile Generation

The hydrated contact lens front surface radius of curvature ($R_F$) is generated from the thick lens formula using the in-air lens power (P), lens index of refraction (n), center thickness (CT), and back surface radius of curvature ($R_B$).

The thick lens formula may include, by way of non-limiting example: The effective focal length for a thick lens with respect to the principal planes is given by $$\frac{1}{f} = (n-1)\left[\frac{1}{R_1} - \frac{1}{R_2} + \frac{(n-1)d}{nR_1R_2}\right]$$

and the distances from the lens vertices to the principal planes are $$h_1 = -\frac{f(n-1)d}{R_2 n} \quad h_2 = -\frac{f(n-1)d}{R_1 n}$$

For an ophthalmic lens, exemplary variables may include:

$$R_1 = R_F(m)$$

$$h_1 = h_F$$

-continued $$R_2 = R_B(m)$$

$$h_2 = h_B$$

$$d = CT(m)$$

$$\frac{1}{f} = P$$

$$R_F\colon R_F = \frac{(n-1)(nR_B + (n-1)CT)}{nR_BP + n(n-1)}$$

Front and back optic zone surfaces may be generated from front and back radii of curvature and center thickness of the ophthalmic lens other optical element.

Figure 6:
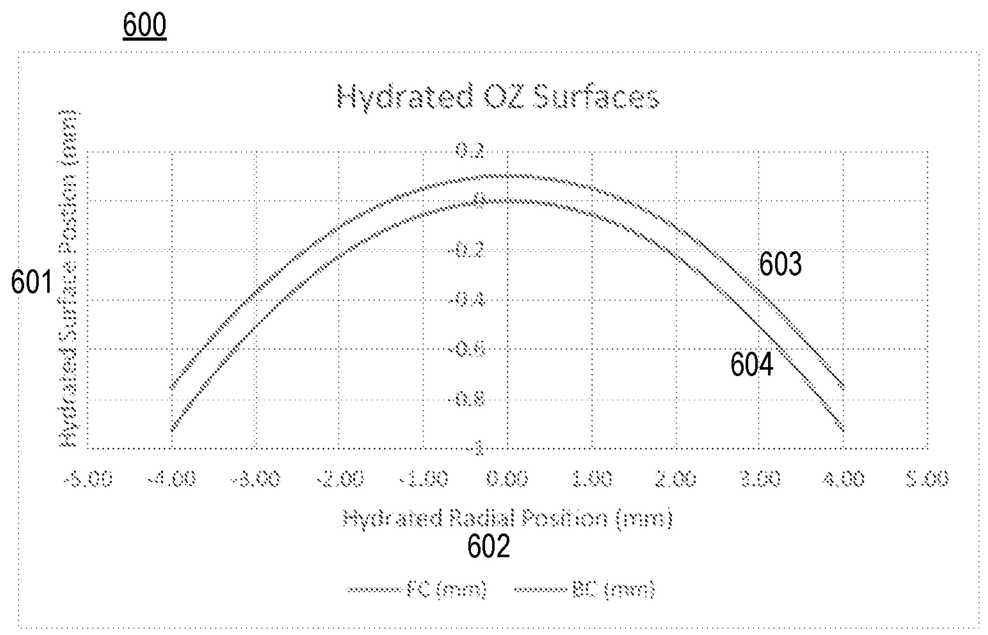
FIG. 6 illustrates a graphical curve representing an exemplary hydrated surface of an ophthalmic lens that is formable according to the present invention.

Exemplary surfaces are shown for a −3.0D design with a 0.1008 mm center thickness, a 9.1 mm back radius of curvature and an index of refraction of 1.4055 are shown in FIG. 6.

In some embodiments, an axial thickness profile may be generated by subtracting a back surface position from a front surface position for multiple radial positions.

A ratio of a hydrated lens to an unhydrated lens may vary based upon the lens material and hydrated lens is 1.4 times larger in each direction than the un-hydrated lens. Therefore, an un-hydrated axial thickness profile may be about 1.4 times smaller than an axial thickness profile generated from the hydrated lens front and back surfaces (as used herein, the term about may be within 10% of a stated amount). Also, radial positions may be about 1.4 times smaller for the un-hydrated lens.

Referring now to FIG. 6, a graphical representation 600 of an optical zone front curve surface 603 and back curve surface 604 of a hydrated ophthalmic lens is illustrated.

The graphical representation 600 includes a first axis with a scale of a hydrated surface position 601 and a second scale with a hydrated radial position 602. A first curve maps values of a front curve 603 and a second curve maps values of a back curve 604 of an ophthalmic lens optic zone.

Figure 7:
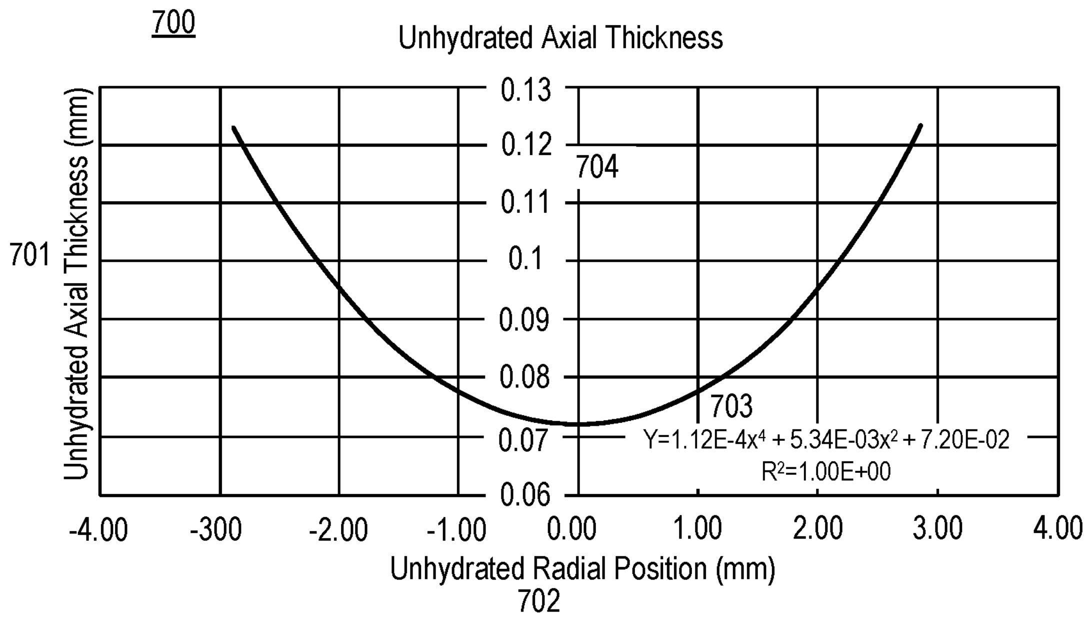
FIG. 7 illustrates a graphical curve representing an exemplary unhydrated axial thickness of an ophthalmic lens that is formable according to the present invention.

Referring now to FIG. 7, a graphical representation 700 of an un-hydrated ophthalmic lens optical zone axial thickness profile 703 is illustrated. In preferred embodiments, an axial thickness profile may be adequately described by an even $4^{th}$ order polynomial. The coefficients from this model may be referenced to generate an optical zone portion of grayscale print pattern, or other energy transmissibility or energy intensity map pattern.

The graphical representation 700 includes a first axis with a scale of an unhydrated axial thickness 701 and a second scale with an unhydrated radial position 702. A curve maps values of axial thickness 703 of an ophthalmic lens optic zone, with numerical values correlating with the thickness 704 displayed in the middle of the graphical representation 700.

For astigmatic lenses, optical power is different for different directions (meridians) in the optical zone. For example, a −2.75D/−4.5DX90 has a power of −2.75D in a vertical direction and −7.5D in a horizontal direction. A resulting axial thickness profile may vary meridian within the optical zone and is 'flattest' in the vertical direction and 'steepest' in the horizontal direction.

Figure 8:
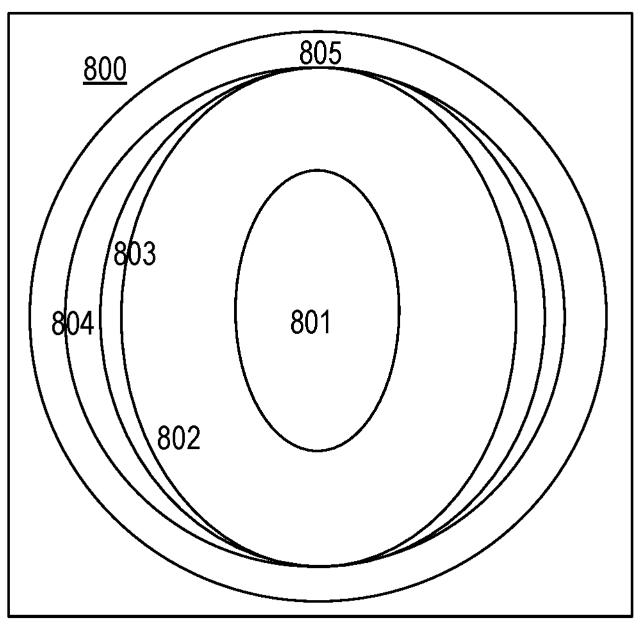
FIG. 8 is a schematic illustration of a false color image of periphery region.

Referring now to FIG. 8, a false color image of a thickness profile 800 is illustrated for an optic zone, where 'a first intensity 801 represents small thickness, and fourth intensity 804 represents an area with a relatively large thickness. One or more intermediate thicknesses 802-803 may also be included, such as a first intermediate thickness 802 and a second intermediate thickness 803. Each thickness may be achieved by depositing an appropriate amount of polymerizable mixture in the respective positions indicated by the thickness profile 800, allowing the polymerizable mixture to settle, pinning the settled polymerizable mixture in place via a gelation process, and finally curing the deposited and pinned polymerizable mixture.

A horizontal (most negative power) and vertical (most positive power) axial thickness profiles may be modeled by even $4^{th}$ order polynomials and the coefficients used to generate an optical zone grayscale print pattern represented by the thickness profile 800.

Energy Transmissibility Print Pattern Generation

In some embodiments, an energy transmissibility print pattern (which may be a grayscale print pattern or other representation of energy intensity) may include two (2) or more regions: an optical zone 801-804 (as illustratively defined by the axial thickness profile); and a periphery 805. Other regions may also be included, such as a region that contains a medicament or other leachable substance. Each region may be defined by various methods. For example, by way of non-limiting example, a pixel size of the print pattern may be specified to be about 0.021 mm. An un-hydrated lens diameter may be, for example: 10.0 mm. A number of pixels in the X & Y directions is defined by the relationship:

$$n_{pixels} = 2 * \text{round}\left(\frac{\text{Diameter}}{2 * \text{pixel size}}\right) + 1$$

This definition ensures that $n_{pixels}$ is odd, so that the center of the lens is at a center of a print pattern.

A number of grayscale levels may also be specified, such as, for example, a print pattern of 8 bits (255 gray levels.) It is within the scope of this invention for both of these values to be changed which may affect the quality of a printed lens.

Spheres

A spherical lens includes an optical zone that is generally rotationally symmetric (within 10% of symmetry) and may be defined, for example, by using an un-hydrated lens center thickness, and the coefficients from the even $4^{th}$ order model:

$$\text{thickness}(\text{mm})(x, y) = CT(\text{mm}) + C_2(\text{mm}^{-1})r(\text{mm})^2 + C_4(\text{mm}^{-3})r(\text{mm})^4,$$
$$r(\text{mm}) = pixelSize(\text{mm}) * sqrt((x - x_0)^2 + (y - y_0)^2),$$

where $(x_0, y_x)$ is the print pattern center. Other variations are also within the scope of the invention.

A center thickness (CT) used to generate a thickness profile may be based upon a hydrated thickness to the number of layers to be printed times the layer thickness. Thus, if a hydrated lens CT is 0.120 mm, the number of layers to print is 6, and the layer thickness is 0.012 mm, the CT used to generate the print pattern is 0.120 mm−0.72 mm=0.048 mm.

In some preferred embodiments, this may be done to ensure that a ratio of a 'brightest' to 'darkest' pixel in the pattern remains in an acceptable range for printing. In other embodiments, images may be converted by print head controller software to binary images. If a range of grayscales is too large, 'bright' regions may not have enough 'dark' pixels to create a smooth lens surface.

A thickness may be calculated for pixels where r is less than the un-hydrated optical zone semi-diameter ($r_{max}$), typically 4.0 mm/1.4 (~2.857 mm.)

A periphery 805 is the region where r (mm) is outside the optical zone 801-804, but within a lens diameter. Many different methods may be used to define a thickness profile of the periphery. For example, in some preferred embodiments, patterns use a thickness at the edge of the optical zone for all pixels in the periphery. Alternate methods may include one or more of: linearly tapering the thickness from the value at the edge of the optical to a value defined at the 'edge' of the lens; and tapering the thickness from the value at the edge of the optical to a value defined at the 'edge' of the lens using a higher order polynomial, or conic section; adding a 'stiffening' ring to the periphery to improve lens handling; tapering using different methods in different zones of the periphery; and a combination of tapering and a 'stiffening' ring.

Torics (Astigmatic Lenses)

An optical zone may not rotationally symmetric and may be defined using an un-hydrated lens center thickness, the two (2) sets of coefficients from the even $4^{th}$ order models of the most positive and most negative power meridians, and a desired angle in a print pattern of a most positive power meridian.

For example, in some embodiments, print patterns may be generated vis calculating the 'effective' $2^{nd}$ order coefficient for each principle meridian:

$$C_{2,effective}(\text{mm}^{-1}) = C_2(\text{mm}^{-1}) + 0.5C_4(\text{mm}^{-3})r_{max}(\text{mm})^4$$

The 'equivalent' $r_2$ coefficient is defined as the average of the two (2) effective coefficients. The astigmatic coefficient is defined as:

$$C_{2,2}(\text{mm}^{-1}) = 0.5(C_{2,effictive,minus}(\text{mm}^{-1}) - C_{2,effective,plus}(\text{mm}^{-1})),$$

where $C_{2,effective,plus}$ is the effective second coefficient of the most positive meridian, and $C_{2,effective,minus}$ is the effective second coefficient of the most negative meridian. For each pixel in the lens print pattern, the distance from the lens center (r(x,y)) and the angle in standard Cartesian coordinates (θ(x,y)) are calculated.

An optical zone thickness may be defined as:

$$\text{thickness}(\text{mm})(x, y) = CT(\text{mm}) + (C_{2,equivalent}(\text{mm}^{-1}) + C_{2,2}(\text{mm}^{-1})\cos(\vartheta(x, y) + \varphi))r(\text{mm})(x, y)^2,$$

where φ is the angle of the most positive meridian.

A thickness at the edge of the optical zone varies with angle. For toric print patterns, a transition zone may be generated to produce a single thickness value for all angles. The transition zone may be an annulus 0.5 mm wide for the hydrated lens (0.5 mm/1.4 for the un-hydrated lens.) A target thickness for the transition may be equal to a minimum thickness at the optical zone boundary and may essentially be equal to:

$$\text{thickness}_{target}(\text{mm}) = CT(\text{mm}) + \left(C_{2,equivalent}\left(\text{mm}^{-1}\right) + C_{2,2}\left(\text{mm}^{-1}\right)\right)r_{OZ}(\text{mm})^2$$

The thickness for each pixel in the transition region is defined as a linear function of its radial position. The thickness at the optical zone edge is defined for each pixel in the transition region as:

$$\text{thickness}_{OZ\ Edge}(\text{mm})(x, y) = CT(\text{mm}) + \left(C_{2,equivalent}\left(\text{mm}^{-1}\right) + C_{2,2}\left(\text{mm}^{-1}\right)\cos(\vartheta(x, y) + \varphi)\right)r_{OZ\ Edge}(\text{mm})(x, y)^2$$

A slope for each point is defined as:

$$\text{slope}(x, y) = \frac{\text{thickness}_{OZ\ Edge}(\text{mm})(x, y) - \text{thickness}_{target}(\text{mm})}{\text{width}_{transition}(\text{mm})}$$

The intercept for each point is defined as:

$$\text{intercept}(\text{mm})(x, y) = \text{thickness}_{target}(\text{mm}) - \text{slope}(x, y)r_{transition\ end}(\text{mm})$$

A thickness for each point in the transition region is:

$$\text{thickness}(\text{mm})(x, y) = \text{intercept}(\text{mm})(x, y) + \text{slope}(x, y)r(\text{mm})(x, y)$$

Figure 9:
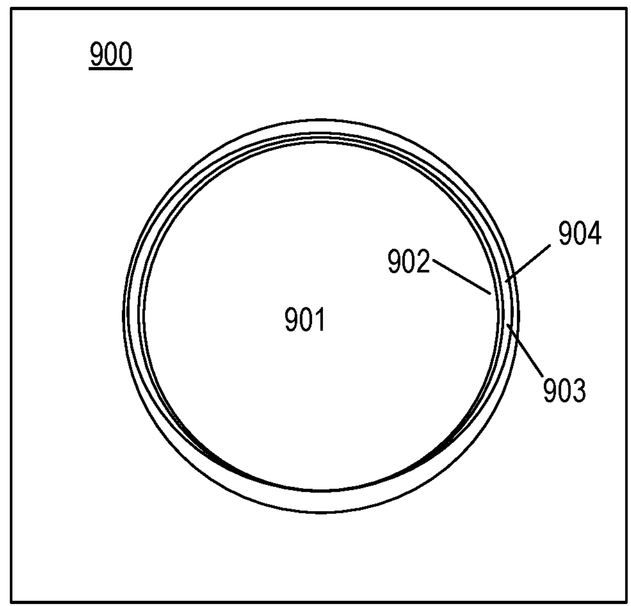
FIG. 9 is a schematic illustration of a false color image of the full lens thickness profile with a transition region zone.

Referring now to FIG. 9, an exemplary graphical image of a transition region is illustrated. A periphery axial thickness profile 900 is defined by a linear change from the end of the transition zone 904 to a minimum axial thickness in the optical zone 901. The slopes and intercepts for the periphery points 902-903 are defined in the same manner as was used to define the transition zone, only using the end of the transition zone and minimum thickness for the edge of the optical zone thickness and the end of the transition zone thickness, respectively. All pixels outside the lens diameter may be set to 0.

Figure 10:
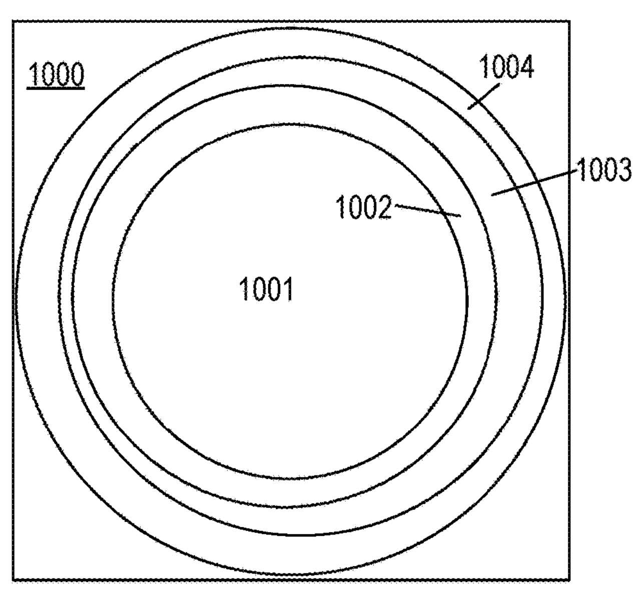
FIG. 10 illustrates a false color image of a thickness profile for a periphery region zone of an astigmatic lens.

FIG. 10 illustrates a thickness profile for a periphery region 1000 of an ophthalmic lens with multiple variant thicknesses 1002-1004 on the periphery region of an optic zone 1001.

Figure 11:
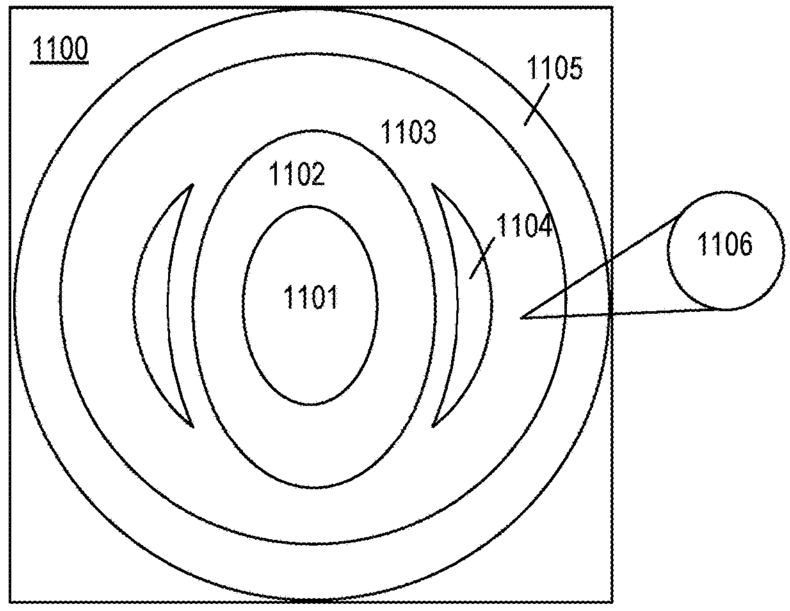
FIG. 11 illustrates a false color image of a thickness profile for an astigmatic lens.

FIG. 11 illustrates a thickness profile of a full ophthalmic lens 1100. The illustrated thickness profile includes lens portions 1101-1105 that comprise an optic zone 1101-1104 and a periphery region 1105. Each of the lens portions 1101-1105 include one or more pixels 1106 (shown in a blown-up view). Each pixel 1106 may be associated with a thickness.

Print Pattern

In some embodiments of an energy transmissibility pattern (e.g., and energy intensity pattern or grayscale pattern) that correspond with a print pattern, 'bright' pixels may represent unprinted areas and 'dark' pixels represent areas which receive deposited polymerizable mixture. An 'intensity' of 'dark' pixels corresponds to a desired thickness of a resulting ophthalmic lens at that position.

In some exemplary embodiments, a print pattern 'intensity' of the lens may be defined as:

$$\text{intensity}(x, y) = 255 - \text{floor}\left(\frac{255 * \text{thickness}(\text{mm})(x, y)}{\max(\text{thickness}(\text{mm})(x, y))}\right),$$

where floor ( ) converts the value to the smallest integer. All pixels outside the lens may be set to 255, such that a smaller intensity value corresponds to a larger thickness, and a smallest value corresponds to a smallest thickness.

The value of 255 corresponds to an 8 bit image. If more than 255 gray levels are used, the value of 255 is replaced with the number of gray levels. For example, for a 10 bit image, the value would be 1023.

Figure 12:
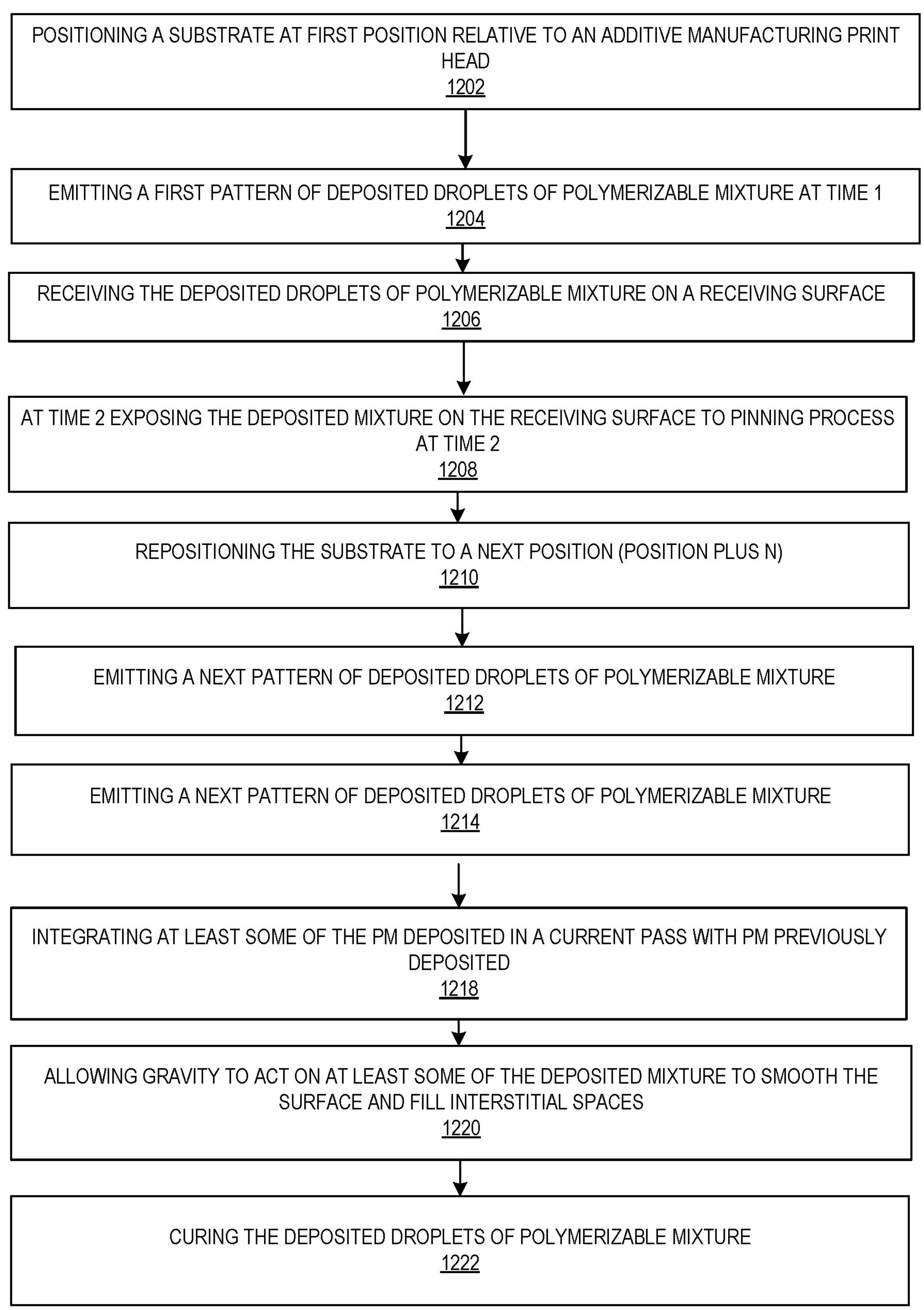
FIG. 12 describes method steps that may be executed while practicing some implementations of the present invention.

Referring now to FIG. 12, method steps for forming an ophthalmic lens, according to some embodiments of the present disclosure, are presented in a flowchart format.

At step 1202, the methods include positioning a substrate at a first position relative to an additive manufacturing printhead. The substrate may include a receiving portion that may be planar or arcuate. The receiving portion may act as a receiving surface for a first pass of a printhead depositing polymerizable mixture. After a first pass, the receiving surface will typically include at least some areas with previously deposited polymerizable mixture.

At step 1204, the method may include emitting a first pattern of deposited droplets of polymerizable mixture from the printhead, the pattern of deposited droplets of polymerizable mixture corresponding with a first portion of an energy transmissibility map of an ophthalmic lens being formed. The pattern is preferably a two-dimensional image that represents light intensity through a desired optic. The droplets with emitted at a time designation, such as T1, which may be relative to other time designations. In preferred embodiments, the two-dimensional representation will have a numerical value associated with an X, Y position (or other coordinate designation). The numerical value will represent an amount of light that passes through an optical element at a position specified by an X, Y axis designation. A print pattern may be based upon the numerical value, such that, in some embodiments, an amount of polymerizable mixture deposited at a position on a receiving surface corresponding the X, Y pattern correlates with the numerical value (e.g., lighter areas will have a lower X, Y numerical value and will receive less polymerizable mixture, and darker areas will have a higher X, Y numerical value and will receive more polymerizable mixture).

Design of an optical element may be accomplished via analysis of a ray trace pattern of how light passes through the optical element. In some embodiments, an X, Y numerical value in turn may be derived from a mathematical model of a desired optical element three-dimensional shape.

At step 1206, the method may include receiving the deposited droplets of polymerizable mixture onto a receiving surface, the receiving surface may include one or more of: the substrate; an aggregation of polymerizable mixture formed from previously emitted droplets of polymerizable mixture; and an insert. The insert may include, for example, an optical insert, a passive electronic device, an active electronic device; and/or a power source, such as a battery, harvesting device, or antenna.

At step 1208, at a second time (T2) deposited droplets of polymerizable mixture on the receiving surface may be exposed to a pinning process. The pinning process will cause partial polymerization of the deposited droplets of polymerizable mixture. Preferably the partial polymerization results in a viscous aggregation of partially polymerized mixture that is resistant to flow but may integrate with subsequently deposited polymerizable mixture.

At step 1210, the method may include repositioning the substrate (and deposited polymerizable mixture) to a next position (position plus N) relative to the printhead.

At step 1212, the method may include emitting a next pattern of deposited droplets of polymerizable mixture corresponding with a next portion of the energy transmissibility map of an item being formed, such as an ophthalmic lens being formed.

In various implementations of the present invention, the method may include repeating steps multiple times. For example, there may be multiple passes of the printhead relative to the substrate, and multiple dwell times allowing gravity and other natural forces such as, surface tension and microforces, to act on at least some of the deposited droplets of polymerizable mixture to smooth a surface of the deposited polymerizable mixture and fill interstitial spaces between the deposited droplets and aggregating of deposited material with material already deposited and pinned. Accordingly, at step 1214 a next pattern of droplets of polymerizable material may be emitted. The pattern may be the same pattern as a previous pattern or a different pattern.

At step 1218, polymerizable material deposited in a current pass of a printhead may be integrated with material on the receiving surface, such as material previously deposited. In some embodiments, the integrated material may form a single volume of polymerizable mixture on the substrate.

At step 1220, one or both of natural occurring forces and gravity may be allowed to act on at least some of the deposited droplets of polymerizable mixture to smooth a surface of the deposited polymerizable mixture and fill interstitial spaces between the deposited droplets and aggregating of deposited material with material already deposited and pinned.

At step 1222, the method may include curing the deposited droplets of polymerizable mixture.

In some embodiments, a pinning process may include exposing the deposited droplets of polymerizable mixture to a first wavelength of actinic radiation for a limited amount of time sufficient to case gelation of the deposited droplets of polymerizable mixture and not cause curing of the deposited droplets of polymerizable mixture. Similarly, in some embodiments, a cure process may include exposing deposited polymerizable mixture to a second wavelength of actinic radiation for a sufficient time and of sufficient intensity to cause polymerization of the deposited droplets of polymerizable mixture. Some embodiments may also include facilitating a cure process by an increase in ambient temperature.

Figure 13:
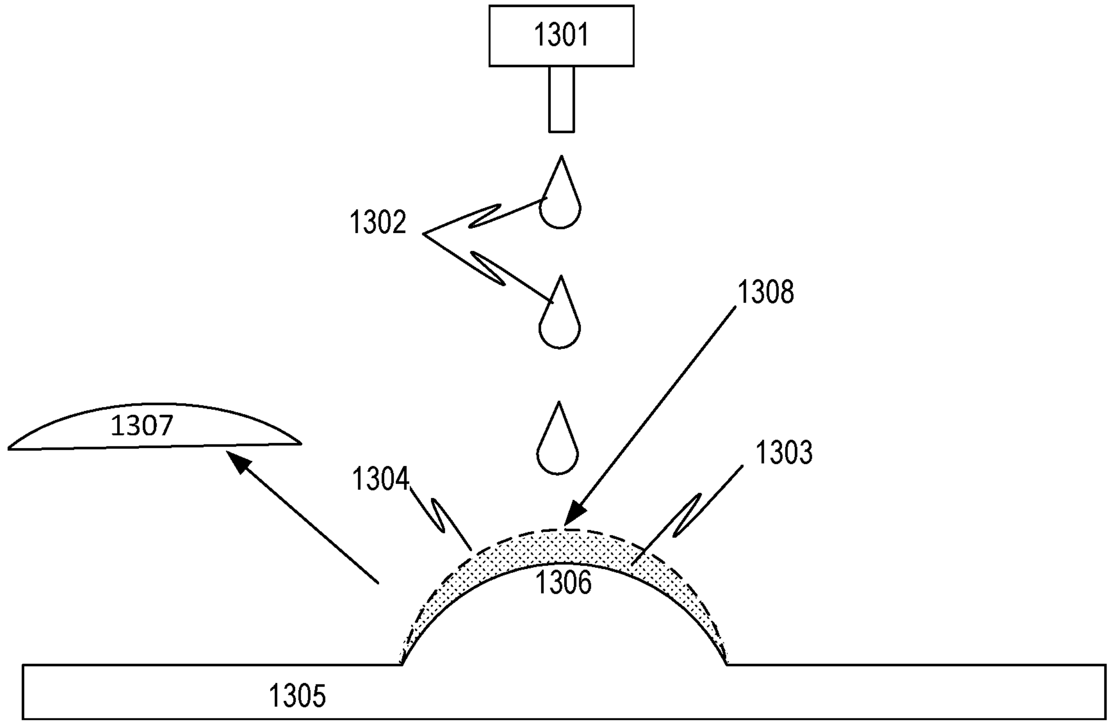
FIGS. 13, 13A, and 13B are schematic illustrations of deposited droplets of polymerizable mixture integrating into a volume of polymerizable mixture previously deposited on a substrate.

Referring now to FIG. 13, a schematic diagram illustrates deposition of one or more polymerizable mixtures 1302 from one or more printhead(s) 1301 to form an ophthalmic lens 1307. The printhead 1301 deposits polymerizable mixture 1302 until a volume of polymerizable mixture 1303 is formed on a receiving area 1306 of the substrate 1305 in a pattern that replicates a 2D pattern used to generate control commands for each pass of the printhead 1301 in relation to a position of the substrate 1305. At least some of the receiving arca 1306 of the substrate 1305 will act as a receiving surface of the deposited polymerizable mixture 1302 until a volume of deposited polymerizable mixture 1303 covers a footprint area for a design of the ophthalmic lens 1307.

As stated herein, in some preferred embodiments relating to optical elements, amounts of polymerizable mixtures 1302 deposited from a printhead 1301 to form an ophthalmic lens 1307, vary in accordance with a two-dimensional pattern that represents an integer map of energy intensity (which may represent transmissibility of energy through the ophthalmic lens).

The pattern is preferably a two-dimensional image that represents light intensity through a desired ophthalmic lens 1307. In preferred embodiments, the two-dimensional representation will have a respective numerical value associated with multiple X,Y positions. The numerical value may represent an amount of light that passes through the ophthalmic lens 1307 at a given position specified by an X,Y axis designation.

Control commands to the printhead cause the printhead 1301 to deposit polymerizable mixture 1302 based upon a two-dimensional print pattern specifying an amount of polymerizable mixture 1302 deposited at a given X,Y position. After multiple successive passes of depositing the polymerizable mixture 1302, a volume of polymerizable mixture 1303 on the substrate 1305 possesses a three-dimensional shape representative of the mathematical model of the desired ophthalmic lens.

The two dimensional print pattern of an amount of polymerizable mixture that represents an amount of light that passes through the ophthalmic lens 1307 at a given position specified by an X,Y axis designation may also correlate with an amount of polymerizable mixture 1302 deposited at a position on the receiving surface 1304 (e.g., lighter areas of the two dimensional print pattern will have a lower X, Y numerical value and will receive less polymerizable mixture, and darker areas will have a higher X,Y numerical value and will receive more polymerizable mixture).

In some embodiments, a design of an ophthalmic lens may be accomplished via analysis of a ray trace pattern of how light passes through the ophthalmic lens. Preferably, an X, Y numerical value in turn may be derived from a mathematical model of a three-dimensional shape of a desired ophthalmic lens.

According to the present invention, the two-dimensional print pattern specifying an amount of polymerizable mixture deposited at a given X, Y position is printed multiple times in successive passes of the printhead relative to the substrate 1305. Deposited polymerizable mixture 1302 is received onto a receiving surface 1304. The receiving surface 1304 may include one or both of: a volume of previously deposited polymerizable mixture 1303, and a receiving area 1306 of the substrate 1305.

Deposited polymerizable mixture 1303 undergoes a pinning and/or gelation process to form a volume of gelled polymerizable mixture 1303. The volume of gelled polymerizable mixture 1303 is polymerized sufficiently to prevent (or at least substantially slow a movement of) the polymerizable mixture that has been received onto the receiving surface while allowing subsequently deposited polymerizable mixture 1302 to meld with previously deposited (and pinned) volume of polymerizable mixture 1303 and form a structure with a single mass of polymerizable mixture. In preferred embodiments, melding may include intermingling with, or becoming interspersed with, the volume of previously deposited and pinned polymerizable mixture 1303 such that individual layers or striations of deposited polymerizable mixture 1302 are not discernable in a volume of polymerizable mixture 1303 formed on a receiving area 1306 of the substrate 1305 once the volume of polymerizable mixture 1303 is cured. Such embodiments may be preferred since unwanted diffraction may be an optical quality resulting from successive steps or other interlayer artifacts associated with disparate layers of polymerized material being present in an ophthalmic lens.

Prior to pinning, naturally occurring forces may be given a specified period of time to act upon a surface 1304 of the volume of polymerizable mixture 1303 to smooth the surface 1304 and/or fill interstitial aberrations in the surface and thereby improve optical qualities of a resulting ophthalmic device (as compared to a surface of a machined lens and/or a lens formed from a machined mold part). Naturally occurring forces may include, for example, without limitation, one or more of: Vander Waals forces (e.g., Keesom force, Debye force, and London dispersion force); Ion-dipole forces; ion induced dipole forces; beta bonding; and dipole-dipole bonding force (e.g., hydrogen bonding).

Curing of the volume of polymerizable mixture 1303 follows disposition of droplets polymerizable mixture 1302 during a final pass of the printhead 1301 and the substrate 1305. Curing may be processed by exposure of the volume of polymerizable mixture 1303 to actinic radiation and/or heat sufficient to cause a substantially complete polymerization of the volume of polymerizable material 1303.

As illustrated, FIG. 13 shows a printhead 1301 that is essentially perpendicular to an apex 1308 of deposited polymerizable mixture 1303. In various embodiments, droplets polymerizable mixture 1302 may (or may not) follow a trajectory that is perpendicular to the apex 1308 of a receiving surface, which may include one or more of: the substrate 1305, a receiving arca 1306 and a surface of the previously deposited polymerizable mixture 1303.

Figure 13A:
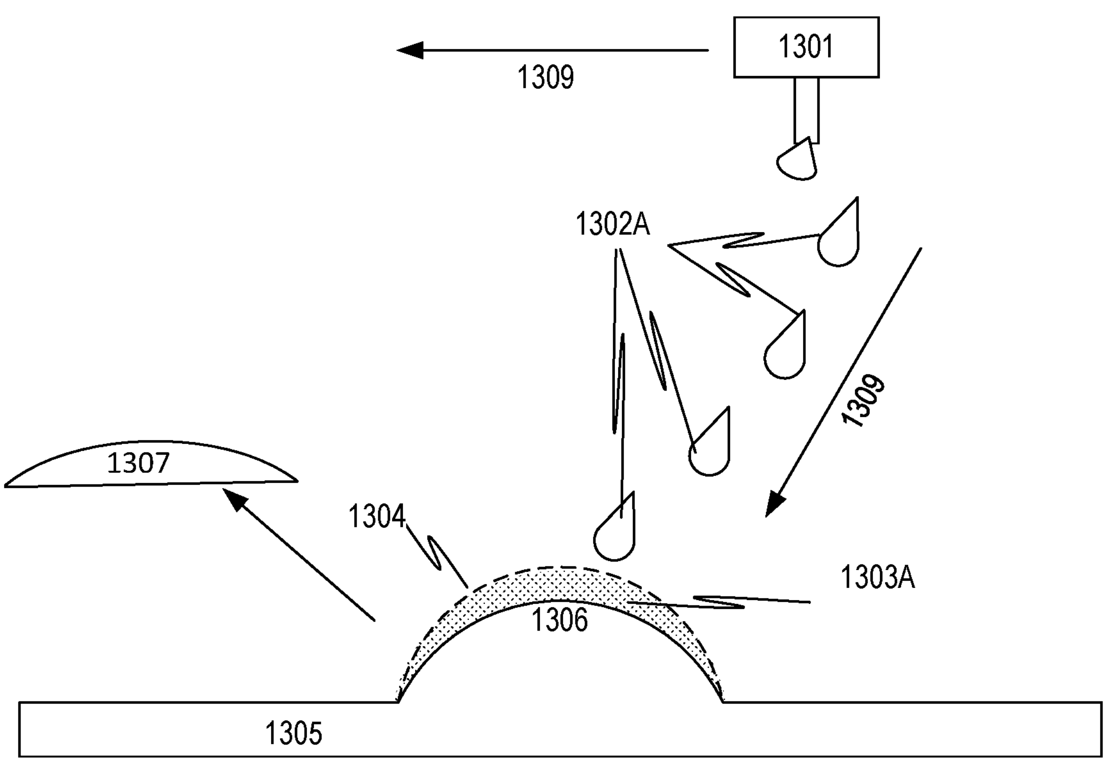

Referring now to FIG. 13A, a printhead 1301 illustrated moving in a direction 1309 of a printing path. Deposited droplets of polymerizable mixture 1302A will follow a droplet trajectory 1309 influenced by the speed and direction of the printhead 1301 at a time of release of the droplets of polymerizable mixture 1302A. The droplet trajectory 1309 will have a speed and direction of its own. According to the present invention, in some embodiments, a printhead 1301 and a droplet trajectory 1309 may be at an angle other than a right angle to the surface of the apex of a receiving surface 1304. At least a portion (e.g., which may be a majority) of deposited droplets of polymerizable mixture 1302A will integrate and/or meld into previously deposited polymerizable mixture 1303A. Following integration, the deposited polymerizable mixture 1302A may be exposed to actinic conditions, such as sufficient actinic radiation to cause gelation and/or pinning; and ultimately cured. In this manner, the present process differs over previously known processes that require a small portion of additive manufacture material to be placed on a surface in an incremental manner and not become integrated into previously deposited material before being cured.

Figure 13B:
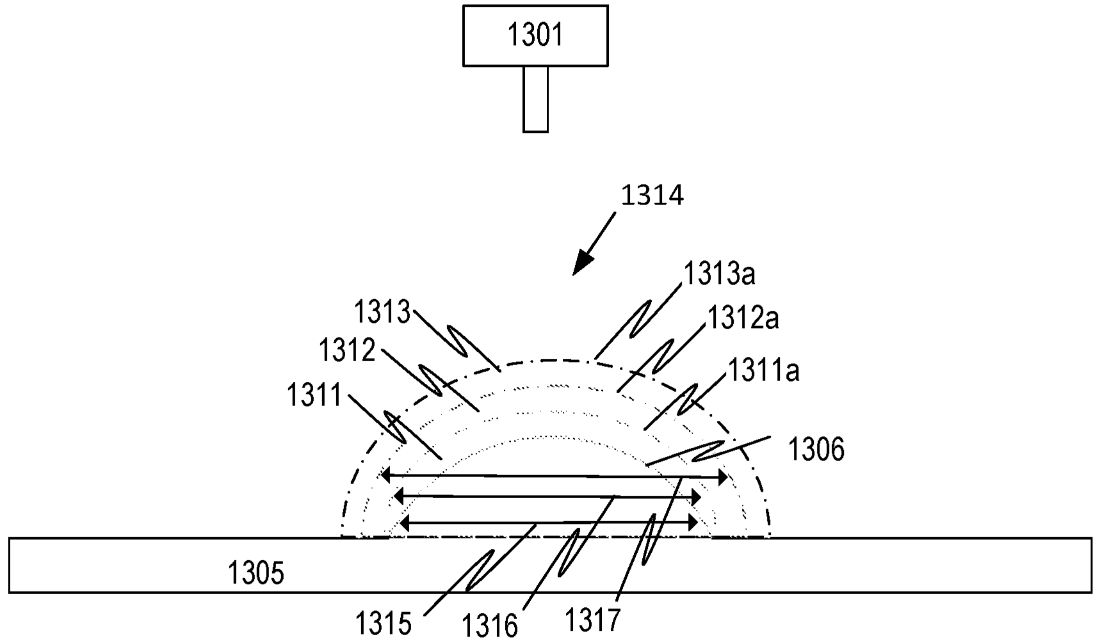

Referring now to FIG. 13B, a substrate 1305 is illustrated with a receiving area 1306 and polymerizable mixture deposited from a first deposition event 1311; polymerizable mixture deposited from a second deposition event 1312; and polymerizable mixture deposited from a third deposition event 1313. Each deposition event may include emitting of a pattern of polymerizable mixture from the printhead 1301. The pattern of polymerizable mixture may be emitted during relative movement of the printhead and the substrate 1305; or while the printhead 1301 is stationary relative to the substrate 1305. It should be noted that while polymerizable mixture from only three deposition events is illustrated, the present invention is not limited to a maximum number of deposition events that may be optimal to form a desired object. For example, in some embodiments, 8, 12, 16, 20 or 24 deposition events may be optimal to form an ophthalmic device. In other embodiments, 64 or more deposition events may be optimal to form an optical device for use other than on or in the eye. Movement of a printhead 1301 relative to the substrate 1305 may include one or both of rotational movement and lateral movement.

Following a deposition event, deposited polymerizable mixture 1311-1313 may meld, and a gelation or pinning process may be caused by exposure to actinic conditions. After a final deposition event, a curing process may be performed to cure the deposited polymerizable mixture 1311-1313.

Final cure of the deposited polymerizable mixture 1311-1313 will form an ophthalmic device 1314 or other article of manufacture.

During successive deposition events of deposited polymerizable material 1311-1313, successive receiving surfaces 1311*a*, 1312*a*, 1313*a* formed by each deposition event of polymerizable material may be positioned such that a respective receiving surface 1311*a*, 1312*a*, 1313*a* becomes both a receiving surface for a subsequent deposition event, and a back curve to a subsequent sub-optical element formed by a subsequent polymerizable material deposition event. Each addition of polymerizable material may increase a back curve diameter 1315, 1316, 1317 of a sub-optical element (as compared to parameters of other back curves formed via previous polymerizable material events).

Figure 14:
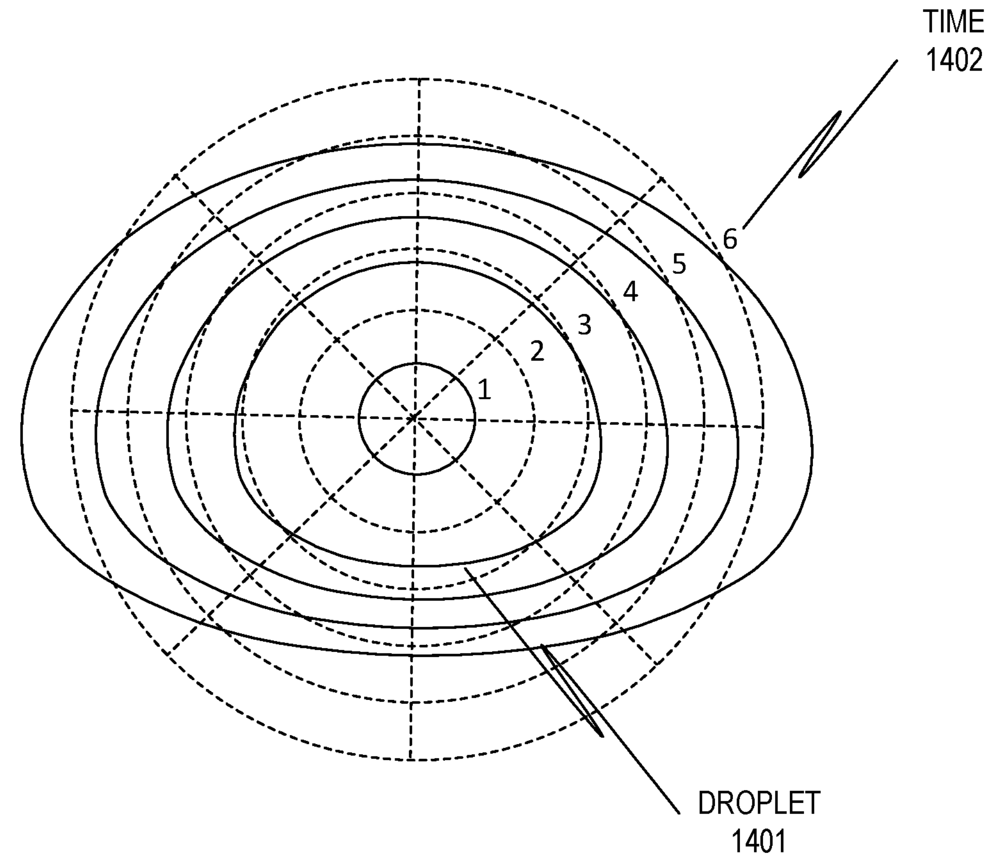
FIG. 14 is a schematic illustration of an exemplary change in shape of a droplet of polymerizable mixture after release from a printhead.

Referring now to FIG. 14, an exemplary dynamic shape of a droplet of polymerizable mixture 1401 is illustrated at various times 1402 after release from a printhead. According to the present invention, the shape of the droplet 1401 may vary based upon a speed of travel of the droplet 1401 through an ambient atmosphere. In some preferred embodiments, an article formed by the processes disclosed herein are generally not influenced by a shape of the droplet of polymerizable material 1401. The relatively small mass of each droplet 1401 and the integration of droplet into other polymerizable material on a receiving surface essentially make a shape of a manufactured article unaffected by a shape of individual droplets 1401, or a changing shape of the droplet 1401 at various times 1402 after release by the printhead (not shown in FIG. 14).

Referring now to FIG. 15 a flowchart 1500 illustrates exemplary method steps that may be executed in some implementations of the present invention.

At step 1501 the process may include positioning a substrate at first position relative to an additive manufacturing printhead.

At step 1502 the process may include emitting a first pattern of deposited droplets of polymerizable mixture from a printhead, the first pattern of deposited droplets of polymerizable mixture corresponding with a first portion of a grayscale image.

At step 1503, the process may include receiving the deposited droplets of polymerizable mixture on a receiving surface, the receiving surface may include one or more of: the substrate; previously emitted droplets of polymerizable mixture; and an inserted article. The inserted article may include, by way of non-limiting example, one or more of: an optical element, such as a rigid permeable lens, an electronic device, and a power source.

At step 1504, the process may include repositioning the substrate to a next position relative to the printhead. Repositioning may include moving one or both of the substrate and the printhead relative to the other.

At step 1505, the process may include emitting a next pattern of deposited droplets of polymerizable mixture from the printhead corresponding with a next portion of the grayscale image.

At step 1506, the process may include allowing physical forces, such as gravity, to act on the deposited droplets of polymerizable mixture.

At step 1507, the process may include integrating at least some of the droplets to form a combined volume of polymerizable mixture on the substrate.

At step 1508, the process may include exposing the deposited droplets of polymerizable mixture on the receiving surface to a pinning process causing partial polymerization of the deposited droplets of polymerizable mixture.

At step 1509, the process may include repeating positioning and deposition steps for multiple passes of the printhead relative to the substrate.

At step 1510, the process may include curing the combined volume of polymerizable mixture to form an ophthalmic lens with multiple sub-optical elements along a same optical path.

The process may include, following each pass of the printhead relative to the substrate, integrating at least some of the droplets of polymerizable mixture deposited during a current pass with polymerizable mixture previously deposited onto the receiving surface to form a combined volume of polymerizable mixture on the substrate. Integration may allow for polymer chains to form from monomer included in the polymerizable mixture deposited in disparate deposition actions such that the monomer is included in disparate volumes of deposited polymerizable mixture.

At step 1511, the process may include releasing a formed ophthalmic lens from the substrate. Release may be accomplished for example, via immersion of the formed ophthalmic lens and substrate in a hydrating solution. Hydration may expand the ophthalmic lens and detach it from the substrate.

GENERAL REMARKS

Although the present description and claims occasionally refer to a mixture (such as a polymerizable mixture), an initiator, other additives, it is within the scope of this invention that the materials and compositions defined herein may comprise one, two, or more types of individual constituents. In such embodiments, a total amount of a respective constituent should correspond to an amount defined above for the individual constituent.

The(s) in the expressions: mixture(s), initiator(s), etc. indicates that one, two, or more types of the individual constituents may be present. On the other hand, when the expression one is used, only one (1) of the respective constituent is present.

It should be understood that the expression % means the percentage of the respective component by weight, unless otherwise noted.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, separation of various system components in the embodiments described above should not be understood as requiring such separation in all embodiments, and it should be understood that the described program components and systems can generally be integrated together in a single hardware and/or software product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A multifocal ophthalmic lens comprising:

a front surface and a back surface meeting at a peripheral edge, and a lens center; and a plurality of layers of cured polymerizable mixture each having a lower surface and an upper surface, wherein each of the plurality of layers of cured polymerizable mixture other than a first layer is at least partially integrated with the prior layer at its lower surface, and each has a natural, smooth optical interface at its upper surface, wherein said multifocal ophthalmic lens has multiple optical qualities within the same optical path, wherein each optical interface of said plurality of layers has an associated optical power.

2. The multifocal ophthalmic lens according to claim 1, wherein at least two of said associated optical powers are different from one another.

3. The multifocal ophthalmic lens according to claim 1, wherein the plurality of layers are aligned on top of one another.

4. The multifocal ophthalmic lens according to claim 1, wherein at least two of the plurality of layers are offset and do not overlap one another.

5. The multifocal ophthalmic lens according to claim 1, wherein at least two of the plurality of layers are offset but overlap one another.

6. The multifocal ophthalmic lens according to claim 1, wherein the ophthalmic lens is a contact lens.

7. The multifocal ophthalmic lens according to claim 1, wherein the ophthalmic lens is a spectacle lens.

8. The multifocal ophthalmic lens according to claim 1, wherein the ophthalmic lens is an intraocular lens.

9. The multifocal ophthalmic lens according to claim 1, further comprising an optical portion and a peripheral portion having a higher mass than said optical portion.

10. The multifocal ophthalmic lens according to claim 1, wherein said peripheral edge is annular.

11. The multifocal ophthalmic lens according to claim 1, wherein said peripheral edge is not annular.

12. A multifocal ophthalmic lens comprising:

a front surface and a back surface meeting at a peripheral edge, and a lens center; and a plurality of sub-optical elements of cured, polymerizable mixture each having a lower surface and a smooth, natural optical interface at an upper surface, wherein said multifocal ophthalmic lens has multiple optical qualities within an optical path, and wherein each optical interface of said plurality of sub-optical elements has an associated optical power.

13. The multifocal ophthalmic lens according to claim 12, wherein said associated optical powers are spherical powers.

14. The multifocal ophthalmic lens according to claim 12, wherein said associated optical powers are aspherical powers.

15. The multifocal ophthalmic lens according to claim 12, wherein said associated optical powers are a combination of spherical and aspherical powers.

16. The multifocal ophthalmic lens according to claim 12, wherein at least two of said sub-optical elements partially, but not fully, overlap one another.

17. The multifocal ophthalmic lens according to claim 12, wherein at least two sub-optical elements do not overlap.

18. The multifocal ophthalmic lens according to claim 12, wherein at least two sub-optical elements are aligned and fully overlap.

19. The multifocal ophthalmic lens according to claim 12, wherein each sub-optical element has a sub-optical element center, and wherein at least two sub-optical element centers are offset from one another.

20. The multifocal ophthalmic lens according to claim 19, wherein the offset is between 100 and 1000 nm.

21. The multifocal ophthalmic lens according to claim 20, wherein the offset is between 400 and 600 nm.

22. The multifocal ophthalmic lens according to claim 21, wherein the offset is 40 and 60 microns.

23. The multifocal ophthalmic lens according to claim 12, wherein the ophthalmic lens is a contact lens.

24. The multifocal ophthalmic lens according to claim 12, wherein the ophthalmic lens is a spectacle lens.

25. The multifocal ophthalmic lens according to claim 12, wherein the ophthalmic lens is a portion of an intraocular lens.

26. The multifocal ophthalmic lens according to claim 12, further comprising an optical portion and a peripheral portion having a higher mass than said optical portion.

27. The multifocal ophthalmic lens according to claim 12, wherein said peripheral edge is annular.

28. The multifocal ophthalmic lens according to claim 12, wherein said peripheral edge is not annular.

29. A multifocal ophthalmic lens comprising:

a front surface and a back surface meeting at a peripheral edge, and a lens center; and a plurality of layers of cured polymerizable mixture each having a lower surface and an upper surface, wherein each of the plurality of layers of cured polymerizable mixture other than a first layer is at least partially integrated with the prior layer at its lower surface, and each has an optical interface at its upper surface, wherein said multifocal ophthalmic lens has multiple optical qualities within the same optical path, wherein the ophthalmic lens is a contact lens.

* * * * *